United States Patent
Petersen et al.

(10) Patent No.: US 11,880,826 B2
(45) Date of Patent: Jan. 23, 2024

(54) EFFICIENT, ACCURATE, AND SECURE PROCESSING OF DIGITAL ASSET CONVERSION TO FIAT CURRENCY

(71) Applicant: Bakkt Marketplace, LLC, Atlanta, GA (US)

(72) Inventors: Christopher Michael Petersen, Lakeway, TX (US); Jeffrey Scott Pittelkau, Montgomery, AL (US); Nikolais Linsteadt, Applegate, CA (US); Joseph Arthur Revnes, Atlanta, GA (US); Brian Daniel Cooper, Marietta, GA (US); William Matthau, Laguna Niguel, CA (US); Yamini Bistesh Sagar, Alpharetta, GA (US); Nicolas Frederic Cabrera, Atlanta, GA (US); Utkarsh Agarwal, Tucson, AZ (US); Tim Kuchlein, Cupertino, CA (US); Bharath Lakshmanan, San Ramon, CA (US); William Andrew Bryant, Alpharetta, GA (US); Stephen Paul Saucier, Atlanta, GA (US); Deepak Kumar, Marietta, GA (US); Anil Jaiswal, Marietta, GA (US); Byungkwon Jeon, Cumming, GA (US); Balaji Devarasetty, Atlanta (CA)

(73) Assignee: BAKKT MARKETPLACE, LLC, Atlanta, GA (US)

( * ) Notice: Subject to any disclaimer, the term of this patent is extended or adjusted under 35 U.S.C. 154(b) by 0 days.

(21) Appl. No.: 17/378,250

(22) Filed: Jul. 16, 2021

(65) Prior Publication Data
US 2022/0188812 A1    Jun. 16, 2022

Related U.S. Application Data

(60) Provisional application No. 63/199,246, filed on Dec. 16, 2020.

(51) Int. Cl.
  *G06Q 20/38* (2012.01)
  *G06Q 20/06* (2012.01)
  (Continued)

(52) U.S. Cl.
  CPC ....... *G06Q 20/381* (2013.01); *G06Q 20/0655* (2013.01); *G06Q 20/10* (2013.01); *G06Q 20/3823* (2013.01); *G06Q 20/405* (2013.01)

(58) Field of Classification Search
  CPC .................................................. G06Q 20/381
  (Continued)

(56) References Cited

U.S. PATENT DOCUMENTS

| | | |
|---|---|---|
| 10,269,009 B1 | 4/2019 | Winklevoss et al. |
| 10,621,561 B1 | 4/2020 | Brock et al. |

(Continued)

FOREIGN PATENT DOCUMENTS

| | | | |
|---|---|---|---|
| WO | 2017/070469 A1 | 4/2017 | |
| WO | WO-2017132333 A1 * | 8/2017 | ......... G06Q 20/0658 |

(Continued)

OTHER PUBLICATIONS

1. Authors et all: Dmitry Beylekchi; Title: Predictive-Free Methods for Digital Financial Asset Management and delayed Functional-Differential Economic Game Models; Xplore IEEE; Date of Conference: Sep. 20-24, 2021 (Year: 2021).*

(Continued)

*Primary Examiner* — Bruce I Ebersman
*Assistant Examiner* — Hatem M Ali
(74) *Attorney, Agent, or Firm* — Alston & Bird LLP

(57) ABSTRACT

Various embodiments of the present disclosure are generally directed to processing conversions of digital assets to fiat currency. An example method includes obtaining a conversion rate for a digital asset via an API, providing the conversion rate via a client device, receiving a digital asset (Continued)

conversion request and executing a digital asset conversion within a configurable time period. Executing the digital asset conversion includes causing digital asset units to be debited from the digital asset user account and causing fiat currency units to be credited to a fiat currency user account. The method further includes dynamically providing a notification of execution of the digital asset conversion via the client device, updating account balance data objects associated with the digital asset user account and the fiat currency user account, and subsequent to executing the digital asset conversion, executing a fiat currency transaction (e.g., a settlement) with a digital asset exchange system.

9 Claims, 10 Drawing Sheets

(51) Int. Cl.
  *G06Q 20/40* (2012.01)
  *G06Q 20/10* (2012.01)
(58) Field of Classification Search
  USPC .................................................... 705/38, 39
  See application file for complete search history.

(56) References Cited

U.S. PATENT DOCUMENTS

| | | |
|---|---|---|
| 11,288,660 B1 | 3/2022 | Kurani |
| 2007/0255662 A1 | 11/2007 | Tumminaro |
| 2009/0119209 A1 | 5/2009 | Sorensen et al. |
| 2013/0185186 A1 | 7/2013 | Blackwood |
| 2015/0046241 A1 | 2/2015 | Salmon et al. |
| 2015/0154572 A1 | 6/2015 | von NotHaus et al. |
| 2015/0170112 A1 | 6/2015 | Decastro |
| 2015/0213419 A1 | 7/2015 | Lyons et al. |
| 2015/0262176 A1 | 9/2015 | Langschaedel et al. |
| 2015/0332256 A1 | 11/2015 | Minor |
| 2015/0363769 A1 | 12/2015 | Ronca et al. |
| 2016/0371771 A1 | 12/2016 | Serrano et al. |
| 2017/0221053 A1 | 8/2017 | Goloshchuk |
| 2017/0357966 A1 | 12/2017 | Chandrasekhar et al. |
| 2019/0139033 A1 | 5/2019 | Ricotta et al. |
| 2019/0220856 A1 | 7/2019 | Li et al. |
| 2019/0303887 A1 | 10/2019 | Wright et al. |
| 2019/0303921 A1* | 10/2019 | Mutter .................. G06Q 20/10 |
| 2019/0303922 A1 | 10/2019 | Hamasni et al. |
| 2020/0042996 A1* | 2/2020 | Mayblum ............ G06Q 20/065 |
| 2020/0042998 A1* | 2/2020 | Mendhi .............. G06Q 20/0658 |
| 2020/0175506 A1 | 6/2020 | Snow |
| 2020/0211098 A1 | 7/2020 | Miyamoto et al. |
| 2020/0265516 A1 | 8/2020 | Xu |
| 2020/0334668 A1 | 10/2020 | Nicli et al. |
| 2021/0012420 A1 | 1/2021 | Balakrishnan |
| 2021/0119807 A1 | 4/2021 | Chen et al. |
| 2021/0398211 A1 | 12/2021 | Maathur et al. |
| 2022/0122062 A1 | 4/2022 | Mayblum et al. |
| 2022/0164815 A1 | 5/2022 | Petersen et al. |
| 2022/0188780 A1 | 6/2022 | Cabrera et al. |
| 2022/0188781 A1 | 6/2022 | El-Bizri |
| 2022/0188811 A1 | 6/2022 | Petersen et al. |
| 2022/0188917 A1 | 6/2022 | Petersen et al. |
| 2022/0237597 A1 | 7/2022 | Petersen et al. |
| 2022/0237598 A1 | 7/2022 | Cabrera et al. |
| 2022/0237599 A1 | 7/2022 | Petersen et al. |

FOREIGN PATENT DOCUMENTS

| | | |
|---|---|---|
| WO | WO-2019/222432 A1 | 11/2019 |
| WO | 2020/049442 A1 | 3/2020 |

OTHER PUBLICATIONS

2. Authors et al: Netalia Dashkevich ; Blockchain Application for Central Banks: A Systemic Mapping Study. Date of Publication: Jul. 27, 2020 (Year: 2020).*

International Searching Authority, International Search Report and Written Opinion for International Application No. PCT/US2021/049625, dated Dec. 21, 2021, (16 pages), European Patent Office, Rijswijk, Netherlands.

International Searching Authority, International Search Report and Written Opinion for International Application No. PCT/US2021/050043, dated Jan. 10, 2022, (16 pages), European Patent Office, Rijswijk, Netherlands.

International Searching Authority, International Search Report and Written Opinion for International Application No. PCT/US2021/050135, dated Jan. 3, 2022, (14 pages), European Patent Office, Rijswijk, Netherlands.

International Searching Authority, International Search Report and Written Opinion for International Application No. PCT/US2021/050137, dated Jan. 3, 2022, (14 pages), European Patent Office, Rijswijk, Netherlands.

International Searching Authority, International Search Report and Written Opinion for International Application No. PCT/US2021/050066, dated Nov. 24, 2021, (15 pages), European Patent Office, Rijswijk, Netherlands.

International Searching Authority, International Search Report and Written Opinion for International Application No. PCT/US2021/043168, dated Nov. 12, 2021, (15 pages).

International Searching Authority, International Search Report and Written Opinion for International Application No. PCT/US2021/043173, dated Nov. 12, 2021, (17 pages).

International Searching Authority, International Search Report and Written Opinion for International Application No. PCT/US2021/043184, dated Nov. 16, 2021, (17 pages).

NonFinal Office Action for U.S. Appl. No. 17/407,962, dated Sep. 21, 2022, (53 pages), United States Patent and Trademark Office, US.

Final Office Action for U.S. Appl. No. 17/407,962, dated Apr. 25, 2023, (29 pages), United States Patent and Trademark Office, US.

NonFinal Office Action for U.S. Appl. No. 17/377,178, dated Feb. 16, 2023, (20 pages), United States Patent and Trademark Office, US.

NonFinal Office Action for U.S. Appl. No. 17/460,799, dated Mar. 1, 2023, (22 pages), United States Patent and Trademark Office, US.

Final Office Action for U.S. Appl. No. 17/460,799, dated Jun. 22, 2023, (12 pages), United States Patent and Trademark Office, US.

NonFinal Office Action for U.S. Appl. No. 17/397,810, dated Aug. 15, 2023, (26 pages), United States Patent and Trademark Office, US.

NonFinal Office Action for U.S. Appl. No. 17/460,799, dated Oct. 12, 2023, (23 pages), United States Patent and Trademark Office, US.

* cited by examiner

EFFICIENT, ACCURATE, AND SECURE PROCESSING OF DIGITAL ASSET CONVERSION TO FIAT CURRENCY

CROSS-REFERENCE TO RELATED APPLICATIONS

This application claims the benefit of U.S. Provisional Patent Application Ser. No. 63/199,246 filed on Dec. 16, 2020, which is incorporated herein by reference in its entirety, including any figures, tables, drawings, and appendices.

TECHNOLOGICAL FIELD

Embodiments of the present disclosure generally relate to transacting, exchanging, transferring, managing, and executing transactions for, and/or the like digital assets and fiat currency.

BACKGROUND

Various embodiments of the present disclosure address technical challenges related to exchanging digital asset units for fiat currency units, managing the processing of such exchanges and transactions, and improving the efficiency of such processing.

BRIEF SUMMARY

In general, embodiments of the present disclosure provide methods, apparatus, systems, computing devices, computing entities, and/or the like for exchanging digital asset units in a digital asset user account associated with an end user of a client device for fiat currency units. The exchange of digital asset units for fiat currency units may be referred to a conversion of a digital asset, a digital asset conversion, a conversion, and/or similar terms used herein interchangeably.

Various embodiments of the present disclosure provide technical advantages by improving processing efficiency and speed of such exchanges by causing the end user to receive fiat currency units in real-time. Various embodiments also provide technical advantages by enabling the intelligent determination of conversion rates of digital assets to fiat currency based at least in part on end user and cohort behavior. In various embodiments, conversion behavior analytics may be aggregated, generated, and provided to a digital asset exchange system with a request for a conversion rate for a digital asset. Even further, various embodiments provide technical advantages by enabling the exchange or the conversion of different digital assets to fiat currency using an identifier token unique to the end user and recognizable by multiple digital asset exchange systems, where each digital asset exchange system may be responsible for the debiting of units of a digital asset owned by the end user. Further still, various embodiments provide technical advantages by evaluating configurable conversion thresholds and/or limits during the conversion of digital asset units to fiat currency units, thereby enabling a digital asset exchange system to maintain control over economic dynamics (e.g., supply, demand) of a digital asset.

In various embodiments, an account management system receives a conversion rate request originating from a client device and determines a conversion rate of a digital asset to provide to the client device. Specifically, the account management system may determine the conversion rate by determining, generating, aggregating, and/or the like conversion behavior analytics and transmitting a conversion rate application programming interface (API) query comprising the conversion behavior analytics and an identifier token associated with the end user of the client device to a digital asset exchange system, to which the digital asset exchange system may respond with a conversion rate API response comprising a conversion rate for the digital asset. In various embodiments, the account management system provides the conversion rate to the client device. In various embodiments, the account management system may repeatedly determine a new conversion rate based at least in part on communicating with the digital asset exchange system in response to an automated timing trigger for one or more configurable time periods and update the client device with the new conversion rate.

In various embodiments, the account management system initiates the conversion of a digital asset to fiat currency in response to receiving a conversion execution request originating from the client device, the conversion execution request representing an approval of the conversion rate by the end user. The account management system may first determine the number of digital asset units and the number of fiat currency units involved in the conversion, which may be selected or indicated by the end user via the client device and/or based at least in part on the conversion rate. In various embodiments, the account management system may evaluate the determined number of digital asset units and the number of fiat currency units involved in the conversion with respect to various conversion thresholds and/or limits established by the digital asset exchange system.

In various embodiments, the account management system may execute the conversion of a number of digital asset units to a number of fiat currency units by causing the debit of the determined number of digital asset units from a digital asset user account associated with the end user of the client device (e.g., by generating and transmitting a conversion execution API query to the digital asset exchange system). In various embodiments, the account management system further executes the conversion by transferring the determined number of fiat currency units to a fiat currency user account associated with the end user of the client device. Thus, various embodiments provide technical advantages by efficiently and rapidly executing the conversion of a digital asset to fiat currency in which the end user promptly receives fiat currency.

In various embodiments, the account management system may then execute a fiat currency transaction with the digital asset exchange system for at least the determined number of fiat currency units that were transferred to the fiat currency user account. In various embodiments, this fiat currency transaction with the digital asset exchange system may comprise fiat currency units corresponding to a plurality of conversions requested by a plurality of end users. As such, various embodiments provide technical advantages by reducing the number of transactions to execute and process by a digital asset exchange system for a plurality of digital asset conversions. In various embodiments, the account management system further updates conversion behavior analytics for the end user and conversion behavior analytics for a cohort to which the end user belongs based at least in part on the executed digital asset conversion.

In accordance with one aspect, a computer-implemented method is provided. The method includes generating and transmitting a first conversion rate application programming interface (API) request. The first conversion rate API request is associated with a first digital asset conversion request at a first timepoint and a digital asset user account identifiable by an identifier token associated with an end user. The first conversion rate API request includes a conversion behavior analytics data object. The first conversion rate API request indicates a digital asset associated with the first digital asset conversion request, and the first digital asset conversion request indicates a first number of digital asset units. The method further includes receiving a first conversion rate API response including a first conversion rate for the digital asset and a fiat currency, and providing the first conversion rate for display via a client device. The method further includes, responsive to determining that a first configurable time period has elapsed: generating and transmitting a second conversion rate API request, the second conversion rate API request indicating the digital asset; receiving a second current pricing data API response including a second conversion rate for the digital asset and the fiat currency; and providing the second conversion rate for display via the client device. The method further includes receiving a second digital asset conversion request. The second digital asset conversion request is at a second timepoint, is associated with the digital asset user account identifiable by the identifier token associated with the end user, and indicates a second number of digital asset units. The method further includes executing a digital asset conversion for the second digital asset conversion request within a second configurable time period. Executing the digital asset conversion includes causing the second number of digital asset units to be debited from the digital asset user account and causing a second number of fiat currency units to be transferred to a fiat currency user account originating from a fiat currency central operating account. The method further includes dynamically providing a notification of execution of the digital asset conversion via the client device. The method further includes updating a first account balance data object associated with the digital asset user account and a second account balance data object associated with the fiat currency user account based at least in part on the digital asset conversion. The method further includes, subsequent to executing the digital asset conversion, executing a fiat currency transaction with a digital asset exchange system.

In accordance with another aspect, a system is provided. The system includes one or more memory storage areas and one or more processors. The system is configured for generating and transmitting a first conversion rate application programming interface (API) request. The first conversion rate API request is associated with a first digital asset conversion request at a first timepoint and a digital asset user account identifiable by an identifier token associated with an end user. The first conversion rate API request includes a conversion behavior analytics data object. The first conversion rate API request indicates a digital asset associated with the first digital asset conversion request, and the first digital asset conversion request indicates a first number of digital asset units. The system is further configured for receiving a first conversion rate API response including a first conversion rate for the digital asset and a fiat currency, and providing the first conversion rate for display via a client device. The system is further configured for, responsive to determining that a first configurable time period has elapsed: generating and transmitting a second conversion rate API request, the second conversion rate API request indicating the digital asset; receiving a second current pricing data API response including a second conversion rate for the digital asset and the fiat currency; and providing the second conversion rate for display via the client device. The system is further configured for receiving a second digital asset conversion request. The second digital asset conversion request is at a second timepoint, is associated with the digital asset user account identifiable by the identifier token associated with the end user, and indicates a second number of digital asset units. The system is further configured for executing a digital asset conversion for the second digital asset conversion request within a second configurable time period. Executing the digital asset conversion includes causing the second number of digital asset units to be debited from the digital asset user account and causing a second number of fiat currency units to be transferred to a fiat currency user account originating from a fiat currency central operating account. The system is further configured for dynamically providing a notification of execution of the digital asset conversion via the client device. The system is further configured for updating a first account balance data object associated with the digital asset user account and a second account balance data object associated with the fiat currency user account based at least in part on the digital asset conversion. The system is further configured for, subsequent to executing the digital asset conversion, executing a fiat currency transaction with a digital asset exchange system.

In accordance with yet another aspect, a computer program product is provided. The computer program product includes at least one non-transitory computer-readable storage medium having computer-readable program code portions stored therein. The computer-readable program code portions include executable portions configured for generating and transmitting a first conversion rate application programming interface (API) request. The first conversion rate API request is associated with a first digital asset conversion request at a first timepoint and a digital asset user account identifiable by an identifier token associated with an end user. The first conversion rate API request includes a conversion behavior analytics data object. The first conversion rate API request indicates a digital asset associated with the first digital asset conversion request, and the first digital asset conversion request indicates a first number of digital asset units. The computer-readable program code portions include executable portions further configured for receiving a first conversion rate API response including a first conversion rate for the digital asset and a fiat currency, and providing the first conversion rate for display via a client device. The computer-readable program code portions include executable portions further configured for, responsive to determining that a first configurable time period has elapsed: generating and transmitting a second conversion rate API request, the second conversion rate API request indicating the digital asset; receiving a second current pricing data API response including a second conversion rate for the digital asset and the fiat currency; and providing the second conversion rate for display via the client device. The computer-readable program code portions include executable portions further configured for receiving a second digital asset conversion request. The second digital asset conversion request is at a second timepoint, is associated with the digital asset user account identifiable by the identifier token associated with the end user, and indicates a second number of digital asset units. The computer-readable program code portions include executable portions further configured for executing a digital asset conversion for the second digital asset conversion request within a second configurable time period. Executing the digital asset conversion includes causing the second number of digital asset units to be debited from the digital asset user account and causing a second number of fiat currency units to be transferred to a fiat currency user account originating from a fiat currency central operating account. The computer-readable program code portions include executable portions further configured for dynamically providing a notification of execution of the digital asset conversion via the client device. The computer-readable program code portions include executable portions further configured for updating a first account balance data object associated with the digital asset user account and a second account balance data object associated with the fiat currency user account based at least in part on the digital asset conversion. The computer-readable program code portions include executable portions further configured for, subsequent to executing the digital asset conversion, executing a fiat currency transaction with a digital asset exchange system.

BRIEF DESCRIPTION OF THE DRAWING(S)

Having thus described the present disclosure in general terms, reference will now be made to the accompanying drawings, which are not necessarily drawn to scale, and wherein:

Figure 4A:
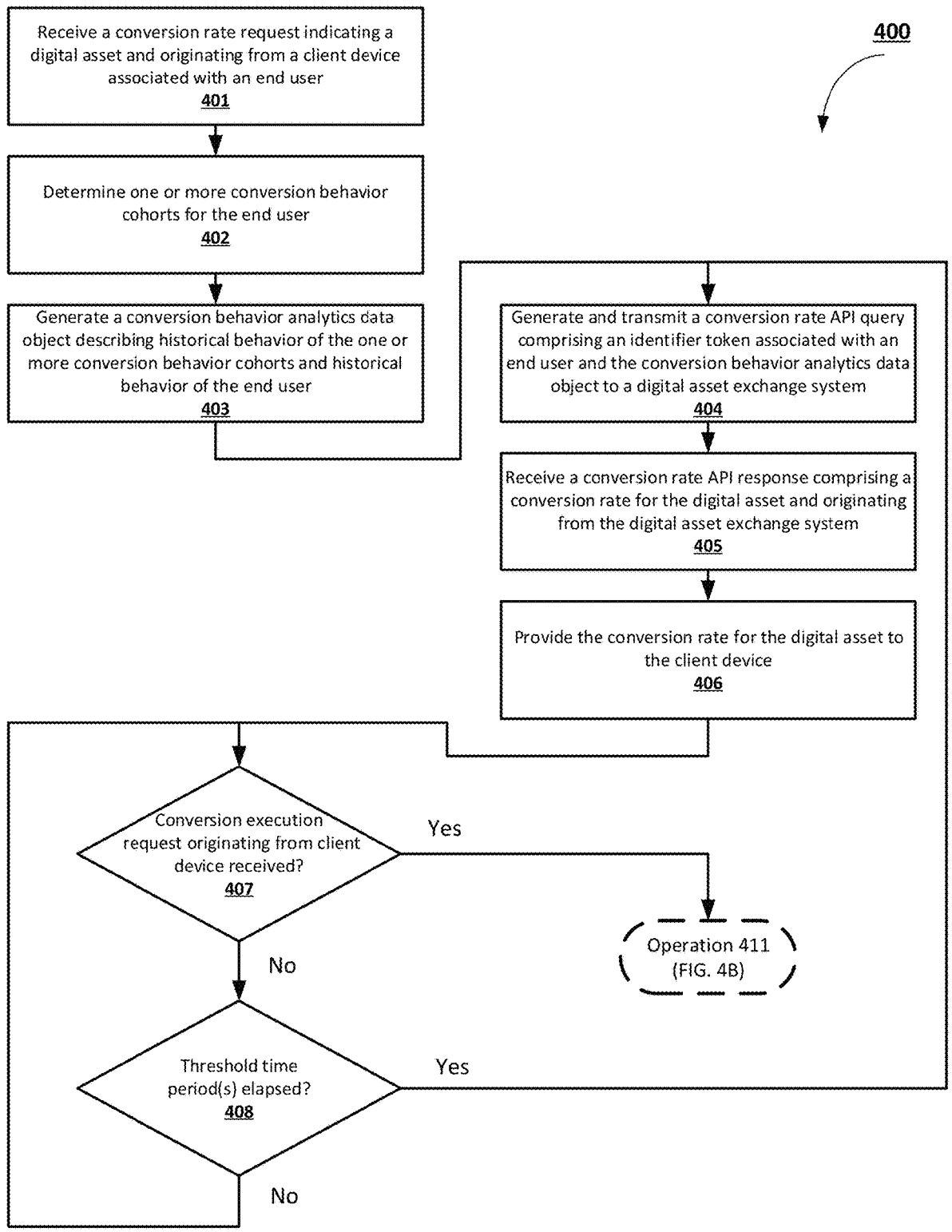
Figure 4B:
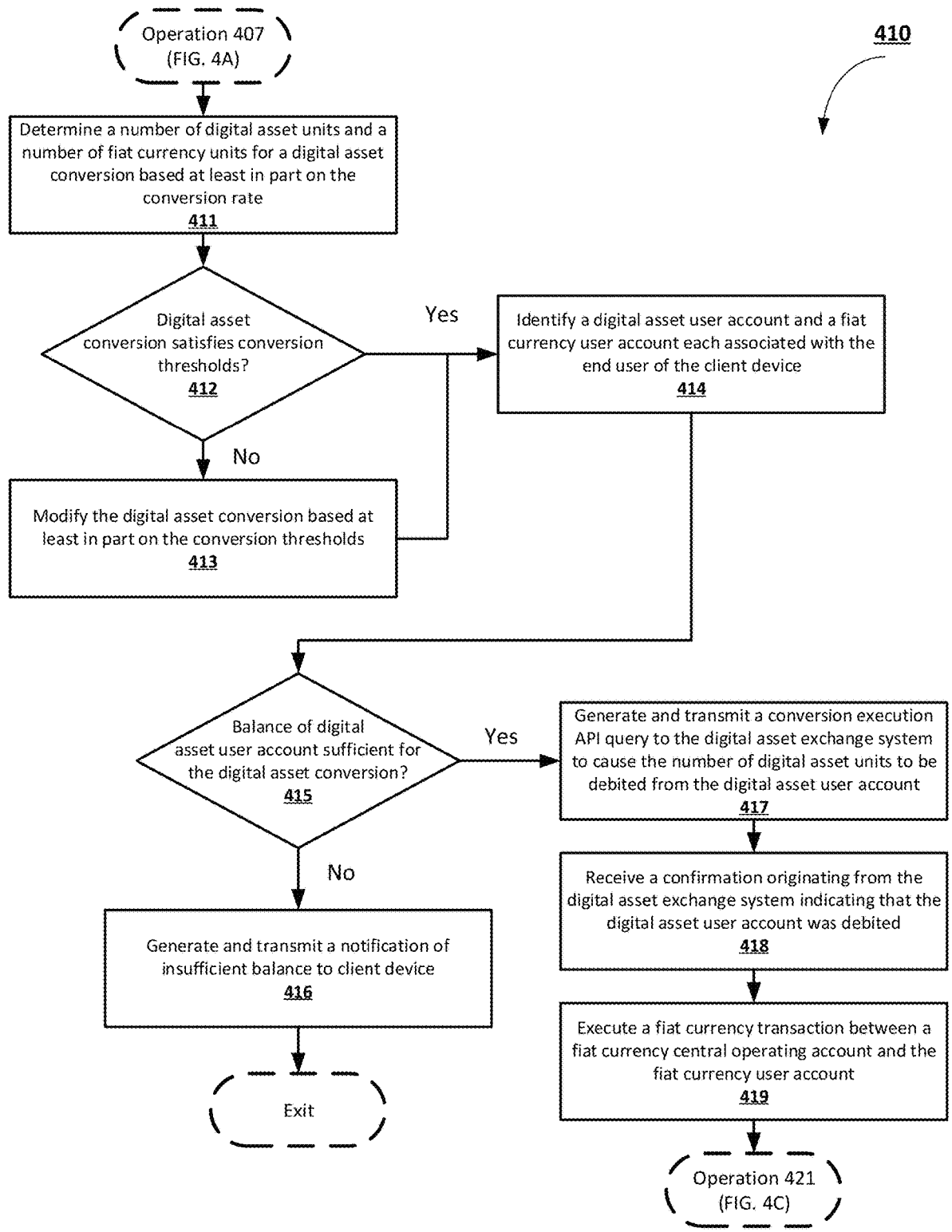
Figure 4C:
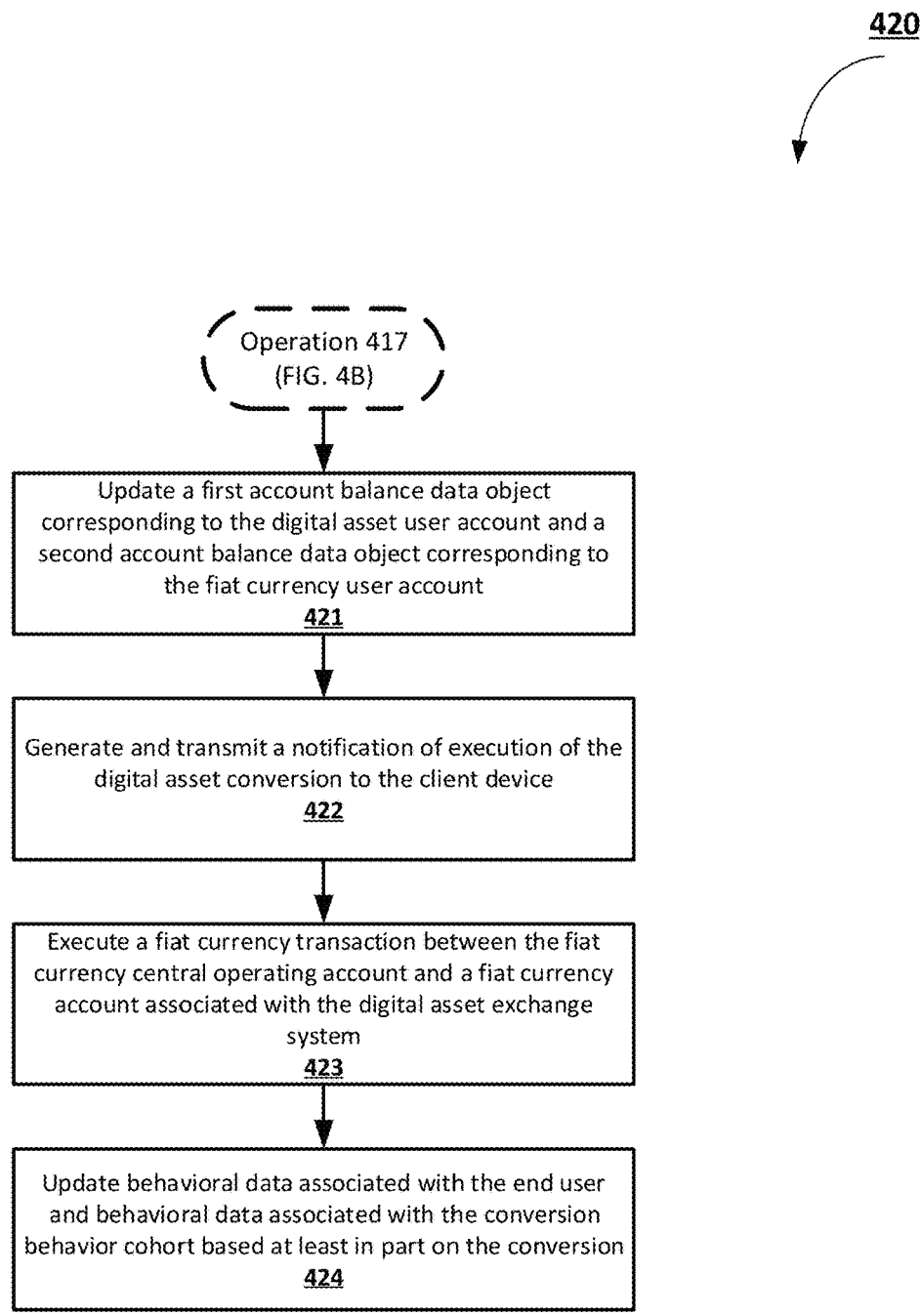

FIGS. 4A-C provide example process flows for converting a digital asset to fiat currency, in accordance with various embodiments of the present disclosure; and FIGS. 5-8 provide example interfaces for converting a digital asset to fiat currency, in accordance with various embodiments of the present disclosure.

DETAILED DESCRIPTION OF SOME
EXAMPLE EMBODIMENTS

Various embodiments of the present disclosure now will be described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. General Overview and Technical Advantages

Various embodiments of the present disclosure are directed to the conversion of digital assets to fiat currency and the execution thereof. In various embodiments, an account management system may be configured to execute the conversion of digital assets to fiat currency for an end user of a client device and/or responsive to a request received originating from a client device. In various embodiments, the execution of the conversion of digital assets to fiat currency comprises the debiting of a number of digital asset units from a digital asset user account and the crediting of a number of fiat currency units to a fiat currency user account.

In various embodiments, the number of fiat currency units is determined based at least on a conversion rate for the digital asset and the number of digital asset units to debit and/or the debited number of digital asset units. In various embodiments, the number of fiat currency units is first credited to a fiat currency user account originating from a fiat currency central operating account associated with the account management system, thereby resulting in the end user receiving fiat currency for the conversion in a rapid and efficient manner.

In various embodiments, the account management system is configured to continuously and periodically determine, retrieve, receive, use, and/or the like a conversion rate for the digital asset based at least in part on one or more configurable time periods. For example, the account management system may be configured to obtain and provide a new conversion rate of a digital asset to a client device responsive to an automated timing trigger for a configurable refresh time period. The account management system may additionally or alternatively obtain a new conversion rate for the execution of a conversion of a digital asset and for the determination of the number of fiat currency units to credit responsive an automated timing trigger for a configurable execution time period. As such, various embodiments of the present disclosure provide technical advantages by providing current and up-to-date conversion rates based at least in part on the configurable refresh time period to an end user such that an end user may initiate and request a well-informed conversion of digital assets and by using current and up-to-date conversion rates based at least in part on the configurable execution time period to execute accurate conversions of digital assets in cases of digital asset value volatility.

Various embodiments of the present disclosure provide further technical advantages by determining, aggregating, generating, and/or the like conversion behavior analytics data objects for an end user and/or a cohort, which may be used by the account management system to obtain a conversion rate of a digital asset. For example, the account management system may transmit a request for a conversion rate which may comprise such conversion behavior analytics data objects. In such an example, a digital asset exchange system may generate or determine a conversion rate for a digital asset which may or may not be based at least in part on the conversion behavior analytics data objects, and the account management system may receive the conversion rate originating from the digital asset exchange system. Thus, various embodiments enable a digital asset exchange system to make intelligent decisions for conversion rates for a digital asset to thereby manage or manipulate a value of the digital asset.

Various embodiments further advantageously enable an entity associated with the digital asset exchange system to manage or manipulate a value of a corresponding digital asset. In various embodiments, an entity associated with the digital asset exchange system may establish various conversion thresholds and/or limits to be evaluated upon execution of a conversion of the corresponding digital asset. Such conversion thresholds and/or limits may bar a number of digital assets to be converted by one end user, by a cohort of end users, by various end users within a specific and configurable time period, and/or the like. An account management system may then evaluate various conversions requested by various end users with respect to such conversion thresholds and/or limits, and accordingly adjust, modify, and/or cancel some conversions based at least in part on the conversion thresholds and/or limits. Similarly, the account management system and/or the digital asset exchange system may determine whether a significant change in digital asset unit supply or distribution is likely to occur, such a significant change having the potential to cause a fiat currency shortage of deficit of the entity associated with the digital asset exchange system. As such, subsequent conversions may be adjusted, modified, and/or cancelled according to a predicted significant change in digital asset unit supply or distribution.

In various embodiments, the account management system enables an end user to request the conversion of different digital assets to fiat currency and may accordingly be configured to communicate with different digital asset exchange systems corresponding to different digital assets (e.g., different digital asset exchange system responsible for at least the debiting of different digital assets). Accordingly, the account management system advantageously enables an end user to convert different and various digital assets to fiat currency. In various embodiments, the account management system may establish, manage, generate, broadcast, and/or the like a unique or federated identifier token associated with an end user and use the identifier token associated with the end user in communications with different digital asset exchange systems for conversions requested by the end user. The identifier token may be mapped to, may be linked with, may reference, and/or the like one or more digital asset user accounts managed, custodied, hosted, and/or the like by digital asset exchange systems. For example, the identifier token may be configured to, when received by a digital asset exchange system, cause the digital asset exchange system to identify and locate a digital asset user accounts associated with (e.g., owned by) the end user associated with the identifier token. The identifier token may map to multiple different digital asset user accounts across multiple different digital asset exchange systems. As such, the account management system advantageously requires less information associated with the end user to communicate with different digital asset exchange systems, in contrast with existing systems that may require unique information (e.g., credentials, identifiers) associated with the end user for each individual digital asset exchange system.

Further, various embodiments provide technical advantages by processing conversions of digital assets to fiat currency in a rapid manner. That is, a user requesting a conversion of a digital asset to a fiat currency may obtain fiat currency units within seconds or minutes of the request. Such rapid processing is particular advantageous over existing methods or systems in which a user obtains fiat currency in exchange for digital assets after hours or days.

Various embodiments of the present disclosure further still provide technical advantages by reducing the number of transactions requiring processing and by reducing network traffic and bandwidth. In various embodiments, the account management system may generate and transmit, to a digital asset exchange system, a settlement data object describing one or more conversions of digital assets to fiat currency executed within a time period, prompting the digital asset exchange system to engage or participate in a fiat currency transaction with the account management system to settle the one or more executed conversions. Accordingly, one or more executed conversions may be settled by one fiat currency transaction, improving transaction efficiency, and reducing the number of communications between the account managing system and the digital asset exchange system.

II. Exemplary Definitions

The term "digital asset" may generally refer to any data entity that is perceived to hold value. For example, a digital asset may be a cryptocurrency or a cryptocurrency digital asset, a liability digital asset such as loyalty points or reward points, an in-game asset or ecosystem-specific asset, and/or the like. For such digital assets, the supply of the digital asset may include multiple digital asset units. A digital asset unit of a digital asset may be understood as a quantification or basis of the digital asset, such as an individual Bitcoin (BTC), one corporate loyalty point, and/or the like. A digital asset may be quantified, managed, transacted, and/or the like based at least in part on full and/or fractional units. For example, a digital asset transaction may involve 1 BTC unit (full unit), while another digital asset transaction may involve 0.4 BTC units (fractional units). A digital asset may also be a single-unit digital asset, such as a non-fungible token (NFT). A digital asset is associated with value and may be used to purchase goods and services or be exchanged for fiat currency. A digital asset may be a strictly digital construct and may not exist in a physical state.

The term "fiat currency" may refer to a currency that is not necessarily related to or backed by a physical commodity. A fiat currency may be centrally managed and distributed by a central entity. Examples of fiat currencies may include U.S. dollars, European Union (EU) euros, Chinese yen, English pounds, and/or the like that are managed and distributed by respective governments. The central entity managing a fiat currency may have the authority to increase and/or decrease the supply of a fiat currency. A fiat currency has inherent transactional value, which may be based at least in part on a relationship between the supply of the fiat currency and the demand of the fiat currency. Thus, the value of fiat currency may be managed by a central entity. The value of fiat currency may be used as a reference for evaluating a variable value of a digital asset. A fiat currency may be quantified by fiat currency units. For example, one unit of a U.S. dollar fiat currency may be understood as a single dollar or a single cent. Value of various digital assets and other purchased goods or services may be described by a number of fiat currency units.

The term "conversion rate" may refer to a data entity configured to describe a value (e.g., a transactional value) of a digital asset. Specifically, a conversion rate may describe the value of a digital asset with respect to a fiat currency. For example, a conversion rate may indicate that one unit of a liability digital asset (e.g., one reward point) may be equal in value with a number of fiat currency units. As another example, a conversion rate may indicate that one unit of a cryptocurrency digital asset may be equal in value with a fractional number of a fiat currency unit. Conversion rates may also describe a standard value of a digital asset, for example, a value with respect to gold or a physical commodity. A conversion rate may be historical, indicative, current, and/or real-time. In one example, historical or indicative conversion rates may describe the variable value of a digital asset over a previous or past time period. Accordingly, conversion rates may be associated with a timepoint or be labelled with timestamps. Similarly, current or real-time conversion rates may describe the value of a digital asset at a present moment in time. As such, current or real-time conversion rates may be refreshed or updated continuously and periodically so as to accurately describe the value of a digital asset at a present moment in time.

The term "identifier token" may refer to a data entity associated with an end user of a client device and may be configured to identify the end user. As used and described herein, an identifier token may be a unique identifier token associated with the end user, and thus, each end user that may communicate with an account management system may be associated and assigned with a unique identifier token. An identifier token may also be a federated, global, universal, and/or the like identifier token configured to identify the same end user in various systems. For example, the identifier token may be used to identify the end user in an account management system, and the same identifier token may be used to identify the end user in various different digital asset exchange systems. The identifier token may include various identifying information for an end user, such as name, birthdate, Social Security Number, and/or the like. The identifier token may be and/or may comprise a globally unique identifier (GUID), a universally unique identifier (UUID), a hash or cryptographic value of user information or credentials, and/or the like.

The term "account balance data object" may refer to a data entity configured to describe at least a number of units stored in, associated with, and/or linked to an account. For example, an account balance data object for a fiat currency account (e.g., a fiat currency user account) may describe the number of fiat currency units associated with the fiat currency account. Likewise, an account balance data object for a digital asset account (e.g., a digital asset user account) may describe the number of digital asset units associated with the digital asset account. An account balance data object may comprise additional information for a corresponding account, such as global or account-specific account identifiers, historical balance data, owner entity credentials, and/or the like. Thus, when any account is referenced herein, one or more account balance data objects may be used to record transactions, conversions, transfers, and/or the like that may cause changes (e.g., an increase, a decrease) to the number of digital asset units associated with an account. Such an account balance data object may indicate or describe entities involved in a transaction, conversion, transfer, and/or the like, entities associated with a corresponding account, fiat currencies, fiat currency units, a digital asset, digital asset units conversion rate, a cost basis, an exchange rate, an equivalence relationship, timestamps, and/or the like.

The term "conversion behavior cohort" may refer to a plurality of end users that are each similar in some aspect to others of the plurality. The conversion behavior cohort may be and/or be associated with a data entity configured to identity and/or describe such plurality of end users. Various information related to each end user (e.g., name, birthdate, Social Security number, permanent address, account identifiers) may then be stored within a conversion behavior cohort. Various aspects for grouping end users in a conversion behavior cohort may include demographic information (e.g., age, location) and/or other information associated with the end user, conversion and/or transaction behavior, account information, and/or the like. For example, a first conversion behavior cohort may include end users who have historically never requested a digital asset conversion, a second conversion behavior cohort may include end users who have historically only requested a digital asset conversion for certain conversion rates, and a third conversion behavior cohort may include end users who have historically requested digital asset conversions in a liberal manner. As another example, a first conversion behavior cohort may include end users who own digital asset user accounts of a first tier, status, and/or the like, and a second conversion behavior cohort may include end users who own digital asset user accounts of a second tier, status, and/or the like. A conversion behavior cohort may identify end users based at least in part on an individual aspect or any combination of aspects.

The term "conversion behavior analytics data object" may refer to a data entity configured to describe conversion and/or transaction behavior of an end user and/or a conversion behavior cohort. For example, a conversion behavior analytics data object may indicate a popular conversion rate at which a high number of digital asset conversions were requested and executed. A conversion behavior analytics data object may also include predictive analytics that may indicate a likelihood of an end user and/or a conversion behavior cohort requesting a digital asset conversion at a particular conversion rate. Thus, a conversion behavior analytics data object may be generated at least in part on a predictive model, optimization model, classification model, neural network model, supervised or unsupervised machine learning model, and/or the like configured to generate predictive analytics.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

Figure 1:
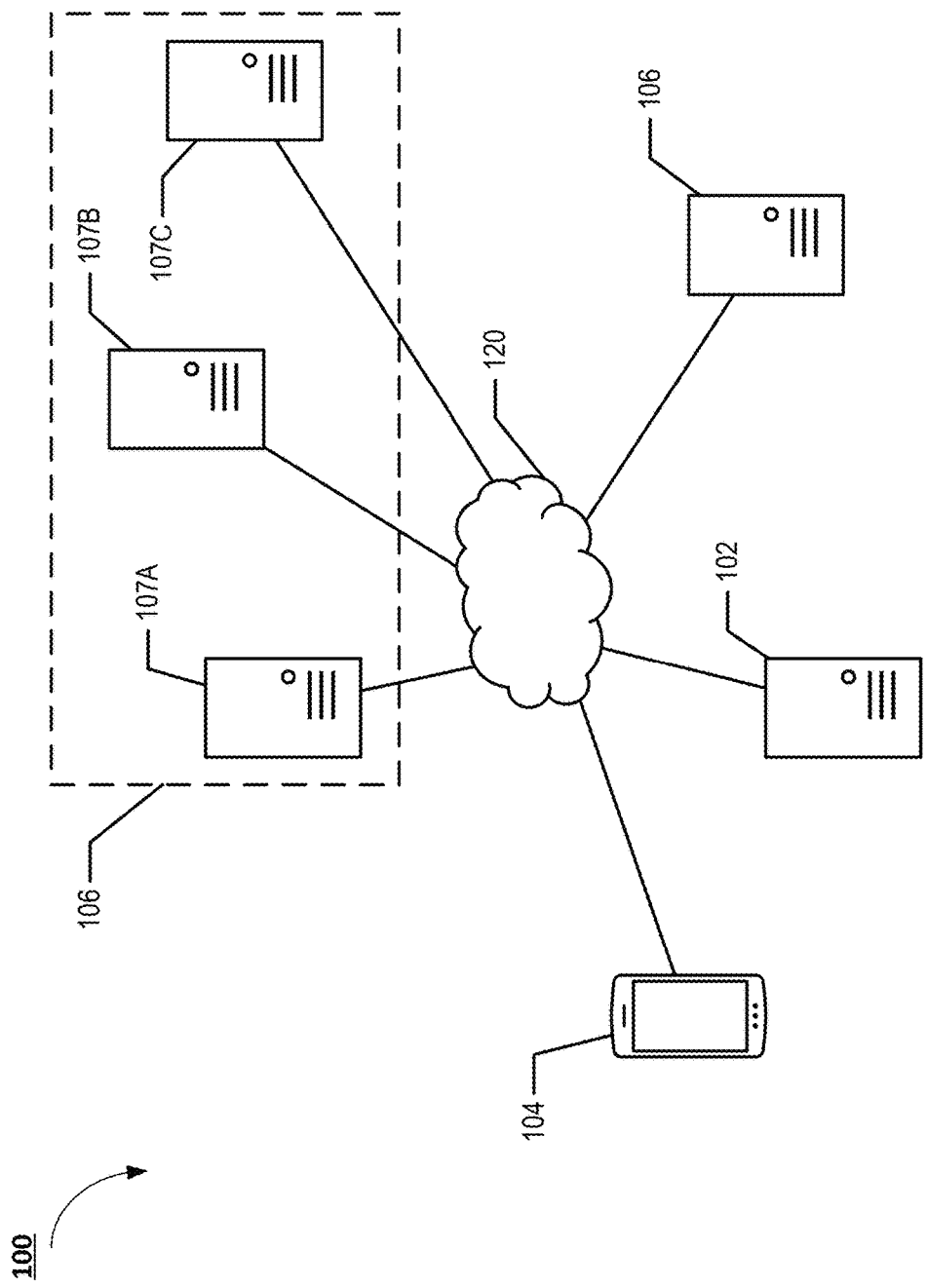
FIG. 1 is an exemplary diagram of a system architecture, in accordance with various embodiments of the present disclosure.

FIG. 1 provides an illustration of an architecture 100 that can be used in conjunction with various embodiments of the present disclosure. As shown in FIG. 1, the architecture 100 may comprise one or more account management systems 102, one or more client devices 104, one or more digital asset exchange systems 106, one or more networks 120, and/or the like. In various embodiments, an account management system 102 is configured to communicate with a plurality of client devices 104 and execute conversions of digital assets to fiat currency for a plurality of end users associated with the plurality of client devices 104. In various embodiments, an account management system 102 may communicate with a digital asset exchange system 106 for and/or during the execution of a conversion of a digital asset to fiat currency for an end user of a client device 104.

As shown in FIG. 1, a digital asset exchange system 106 may be and/or comprise a distributed ledger computing platform comprising a plurality of node computing entities 107 (e.g., 107A, 107B, 107C). For example, in an example embodiment, the digital asset exchange system 106 comprises a plurality of node computing entities 107 in communication with one another via a network 120 and each storing copies of a distributed ledger (e.g., a blockchain) for a digital asset (e.g., a cryptocurrency digital asset). Although not explicitly illustrated, the account management system 102 may be a node computing entity 107 of a digital asset exchange system 106 to enable the execution of the conversion of a cryptocurrency digital asset to fiat currency. Each node computing entity 107 may be configured to commit and retrieve portions of the distributed ledger (e.g., distributed ledger entries, records, blocks, and/or the like). A node computing entity 107 may be a full node computing entity that stores the entirety of a distributed ledger (e.g., a blockchain), a mining node computing entity that maintains the distributed ledger (e.g., a blockchain) by publishing updated records, entries, blocks and/or the like while also storing the entirety of the distributed ledger, a lightweight node computing entity that does not store the entirety of the distributed ledger (e.g., a blockchain), and/or the like. Various node computing entities 107 may be configured for providing events, consensus requests, and/or the like; performing consensus processing; storing a copy of a distributed ledger; and/or the like.

Each of the components of the architecture 100 may be in electronic communication with, for example, one another over the same or different wireless or wired networks 120 including, for example, a wired or wireless Personal Area Network (PAN), Local Area Network (LAN), Metropolitan Area Network (MAN), Wide Area Network (WAN), or the like. In some embodiments, the plurality of node computing entities 107 of a digital asset exchange system 106 may be in electronic communication with one another over a different wireless or wired network 120 than the account management system 102 and/or the client device 104. While FIG. 1 illustrates certain systems as separate, standalone entities, the various embodiments are not limited to this particular architecture.

a. Exemplary Account Management System

In an example embodiment, an account management system 102 may be a computing entity configured for managing and executing conversions of digital assets to fiat currency for various end users of a plurality of client devices 104. For the execution of such conversions, an account management system 102 may debit and/or cause the debiting of a number of digital asset units from an end user and may credit and/or cause the crediting of a number of fiat currency units to the end user. Meanwhile, an account management system 102 may manage a plurality of requests for conversions originating from a plurality of client devices 104, which may be received by the account management system 102 at substantially the same time. In various embodiments, the account management system 102 may store and/or have access to a plurality of account balance data objects which may each indicate a historical account activity. As such, the account management system 102 may maintain a complete record of all digital asset conversions requested and/or executed and may be able to search and find specific digital asset conversions.

In various embodiments, an account management system 102 may be operated by one or more various entities to convert digital assets to fiat currency for various end users. For example, an account management system 102 may be operated by banking institution entities, digital asset exchange entities, stock exchange entities, trading platform entities, and/or the like. In various embodiments, an account management system 102 may be operated by a single such entity, while in other embodiments, an account management system 102 may host and/or be operated by multiple such entities, each managing digital asset conversions for various client devices 104.

Figure 2:
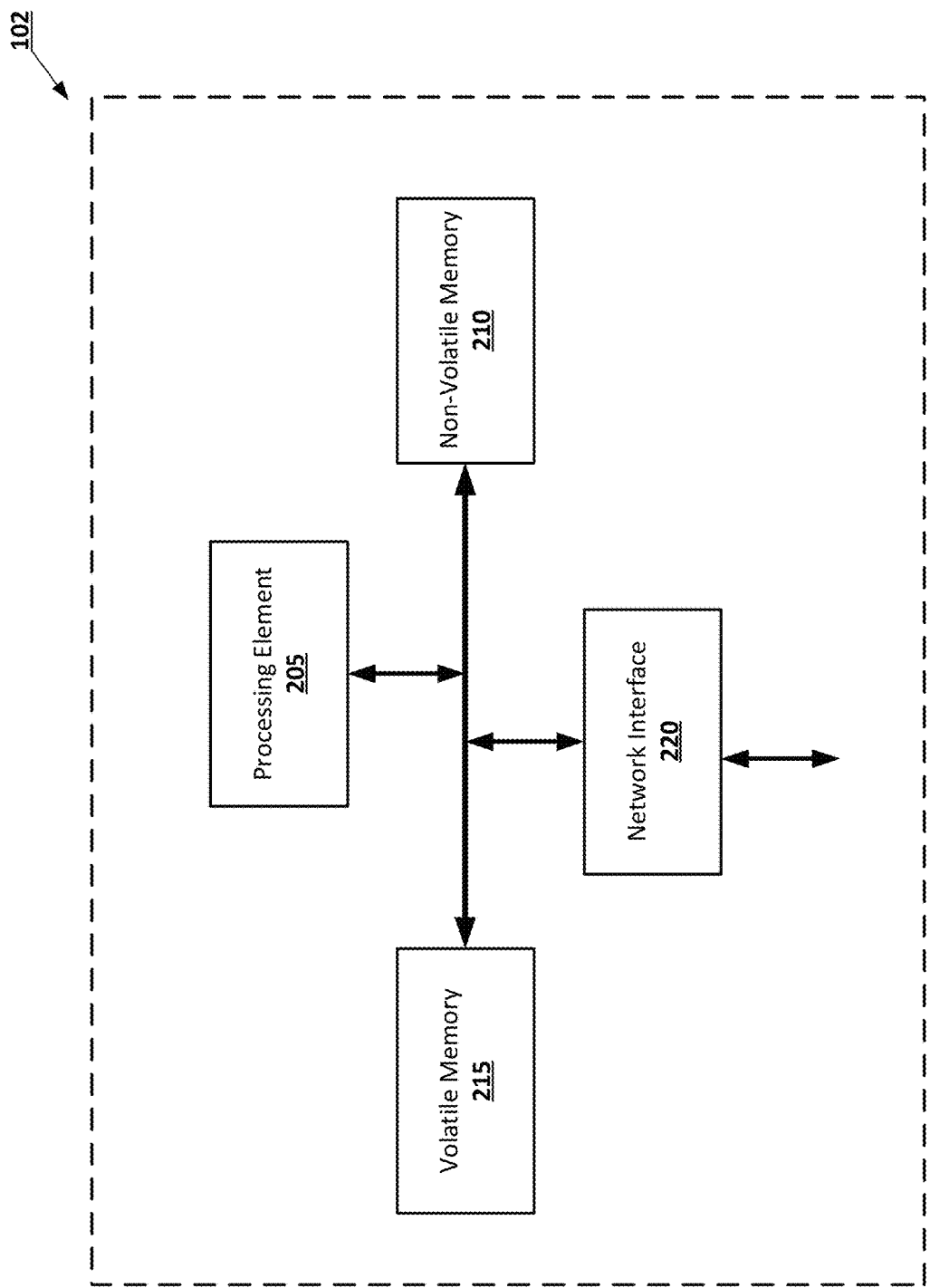
FIG. 2 is an exemplary schematic of an account management system, in accordance with various embodiments of the present disclosure.

FIG. 2 illustrates a schematic of an example account management system 102, according to one embodiment of the present disclosure. As shown in FIG. 2, in one embodiment, the account management system 102 may include, or be in communication with, one or more processing elements 205 (also referred to as processors, processing circuitry, and/or similar terms used herein interchangeably) that communicate with other elements within the account management system 102 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the account management system 102 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the account management system 102 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the step/operation of the account management system 102 with the assistance of the processing element 205 and operating system.

As indicated, in one embodiment, the account management system 102 may also include one or more network interfaces 220 for communicating with various computing entities (e.g., one or more client devices 104, one or more digital asset exchange systems 106), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the account management system 102 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the account management system 102 may include, or be in communication with, one or more input elements, such as a keyboard input, a mouse input, a touch screen/display input, motion input, movement input, audio input, pointing device input, joystick input, keypad input, and/or the like. The account management system 102 may also include, or be in communication with, one or more output elements (not shown), such as audio output, video output, screen/display output, motion output, movement output, and/or the like.

As will be appreciated, one or more of the components of the account management system 102 may be located remotely from other components of the account management system 102, such as in a distributed system architecture. Furthermore, one or more of the components of the account management system 102 may be combined. Additional components performing functions, operations, methods, processes, and/or the like described herein may be included in the account management system 102. Thus, the account management system 102 may be adapted to accommodate a variety of needs and circumstances.

b. Exemplary Client Device

Figure 3:
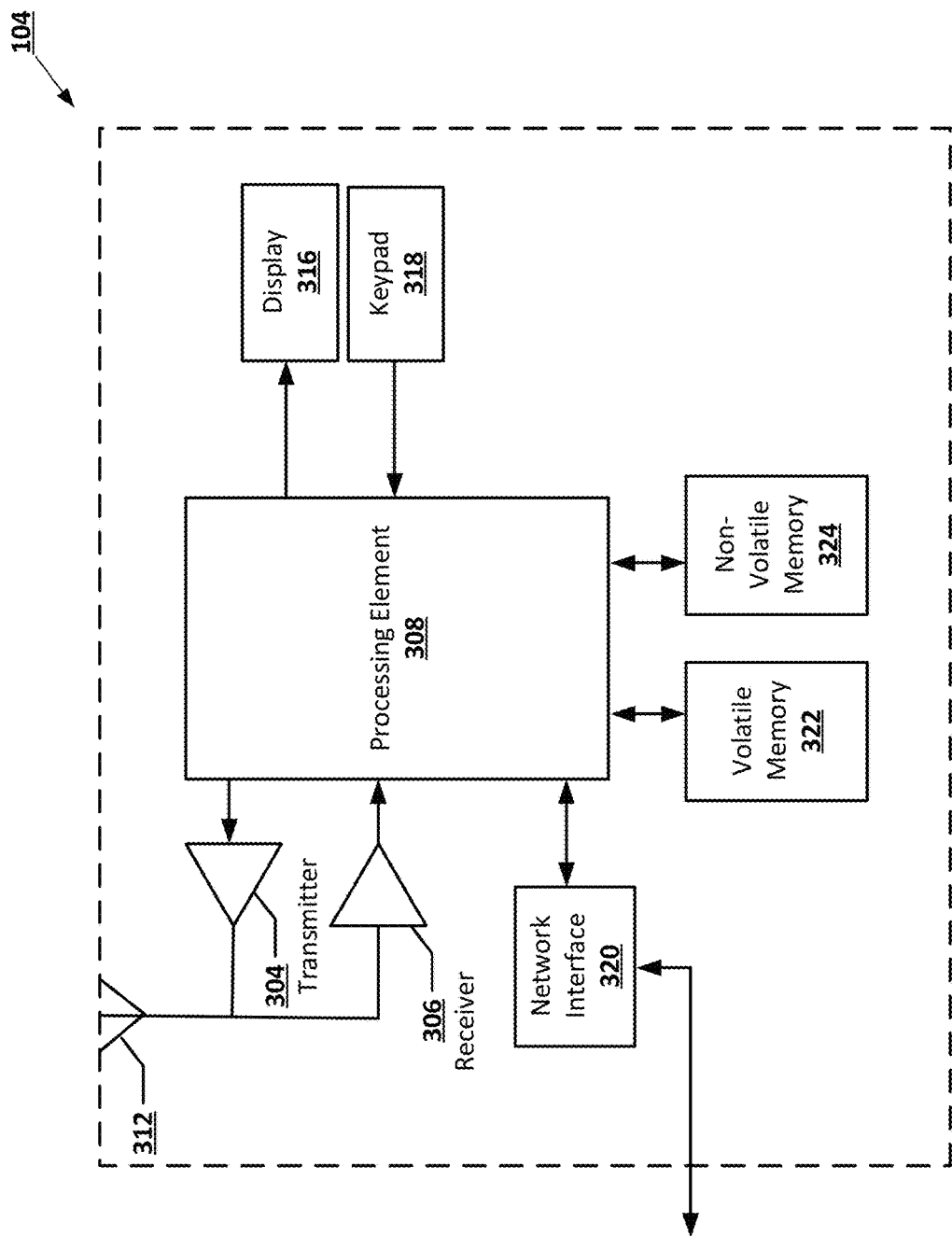
FIG. 3 is an exemplary schematic of a client device node, in accordance with various embodiments of the present disclosure.

FIG. 3 provides a schematic of an example client device 104 that may be used in conjunction with embodiments of the present disclosure. Client devices 104 can be operated by various entities, and an example architecture 100 may include one or more client devices 104. For example, a client device 104 may be associated with, owned by, operated by, and/or the like by one or more end users. In various embodiments, an end user of a client device 104 may wish to convert digital assets to fiat currency, and may request or initiate a digital asset conversion using a client device 104. For example, a client device 104 may be a personal computing device, smartphone, tablet, laptop, personal digital assistant, and/or the like. As shown in FIG. 3, the client device 104 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the account management system 102. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like.

Similarly, the client device 104 may operate in accordance with multiple wired communication standards and protocols, such as those described above with regard to the account management system 102 via a network interface 320.

Via these communication standards and protocols, the client device 104 can communicate with an account management system 102 using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 can also download changes, add-ons, and updates, for instance, to its firmware, software (e.g., including executable instructions, applications, program modules), and operating system.

According to one embodiment, the client device 104 may include location determining aspects, devices, modules, functionalities, and/or similar words used herein interchangeably. For example, the client device 104 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the position of the client device 104 in connection with a variety of other systems, including cellular towers, Wi-Fi access points, and/or the like. Similarly, the client device 104 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client device 104 may also comprise a user interface (that can include a display 316 coupled to a processing element 308) and/or a user input interface (coupled to a processing element 308). For example, the user interface may be a user application, app, browser, user interface, and/or similar words used herein interchangeably executing on and/or accessible via the client device 104 to interact with and/or cause display of information/data from the account management system 102, as described herein. The user input interface can comprise any of a number of devices or interfaces allowing the client device 104 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client device 104 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client device 104 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client device 104. As indicated, this may include a user application that is resident on the entity or accessible through a browser or other user interface for communicating with the account management system 102.

In another embodiment, the client device 104 may include one or more components or functionality that are the same or similar to those of the account management system 102, as described in greater detail above. As will be recognized, these architectures and descriptions are provided for exemplary purposes only and are not limiting to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Exemplary Digital Asset Exchange System

In various embodiments, an example architecture (e.g., the architecture 100 illustrated in FIG. 1) comprises one or more digital asset exchange systems 106. A digital asset exchange system 106 may be associated with one or more digital assets and may be involved in the conversion of one or more associated digital assets. Accordingly, the architecture 100 may include one or more digital asset exchange systems 106 to thereby enable an end user to convert a large variety of different digital assets. In various embodiments, a digital asset exchange system 106 may be a computing entity configured for engaging with an account management system 102 to convert an associated digital asset to fiat currency for an end user. Specifically, a digital asset exchange system 106 may be configured to manage a digital asset user account for the associated digital asset and associated with the end user and may be further configured to debit, deduct, withdraw, transfer, and/or the like a number of digital asset units from the digital asset user account. In various embodiments, the digital asset exchange system 106 may be responsible for transferring fiat currency units to a fiat currency central operating account associated with the account management system 102 and/or an entity operating the account management system 102 in response to debiting a digital asset user account. Thus, the digital asset exchange system 106 may be involved at least in part in the debiting of digital asset units and the crediting of fiat currency units during the execution of a conversion of a digital asset to fiat currency, in various embodiments.

Various entities may be associated with and/or operate a digital asset exchange system 106. For example, a digital asset exchange system 106 may be associated with a liability digital asset that may be loyalty or reward points, and the digital asset exchange system 106 may be operated by or associated with a liability holder entity distributing and/or accepting the loyalty or reward points, such as a store entity, a retailer entity, a service provider entity, a banking institution entity, a credit card manager entity, and/or the like. In some instances, a digital asset exchange system 106 associated with a liability digital asset and a liability holder entity may be operated by a third-party entity on behalf of the liability holder entity and/or the liability holder entity itself. Thus, the digital asset exchange system 106 may be and/or comprise one or more computing entities associated with the liability holder entity and may maintain digital asset user accounts (each associated with liability digital assets) for end users corresponding to the liability holder entity. As such, the digital asset exchange system 106 may store and/or have access to records of transactions made by end users with the liability holders that resulted in the assignment or crediting of liability digital asset units to the end users at a previous point in time. Meanwhile, a digital asset exchange system 106 involved in the conversion of cryptocurrency digital assets may be associated with and/or operated by banking institution entities, monetary exchange entities, cryptocurrency exchange entities, stock exchange entities, trading platform entities, and/or the like and may be configured to communicate with and/or may comprise a distributed ledger computing platform. Further, a digital asset exchange system 106 may be associated with and/or operating by an auctioning platform entity, an asset holding entity, and/or the like. For example, such a digital asset exchange system 106 may be involved in the conversion (e.g., sale) of a NFT by an end user.

In various embodiments, a digital asset exchange system 106 may be configured to generate, determine, and/or have access to historical, indicative, current, and/or real-time conversion rates for a digital asset. For example, a digital asset exchange system 106 may be operated by a liability holder entity that may determine a current conversion rate for a liability digital asset based at least in part on supply models, demand models, speculative models, and/or the like. In various embodiments, the digital asset exchange system 106 may be configured to receive conversion rate request API queries originating from an account management system 102 and to transmit conversion rate API responses comprising historical, indicative, current, and/or real-time conversion rates such that the account management system 102 receives the conversion rates for a digital asset.

Thus, a digital asset exchange system 106 may comprise various means for performing at least the herein described functions, operations, methods, processes and/or the like. For example, a digital asset exchange system 106 may comprise various processing elements, volatile and/or non-volatile memory or memory media, network interfaces, user interfaces, and/or the like—including those described with regard to the account management systems 102 and/or client devices 104.

d. Exemplary Networks

In one embodiment, any two or more of the illustrative components of the architecture of FIG. 1 (e.g., one or more account management systems 102, one or more client devices 104, one or more digital asset exchange systems 106) may be configured to communicate with one another via respective communicative couplings to one or more networks 120. The networks 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may include, for example, global networks (e.g., the Internet), MANs, WANs, LANs, or PANs. In addition, the networks 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. Exemplary System Operation

Various embodiments of the present disclosure include various functions, steps, operations, methods, processes, and/or the like that may (or may be performed to) address technical challenges related to converting digital assets to fiat currency for an end user of a client device 104. As previously discussed, the account management system 102 may periodically retrieve conversion rates for a digital asset based at least in part on a refresh time period and/or an execution time period. The account management system 102 may also aggregate and provide conversion behavior analytics data objects to a digital asset exchange system 106 when retrieving a conversion rate for a digital asset, thereby advantageously providing the digital asset exchange system 106 with a significant amount of information relevant to the determination of a conversion rate for the digital asset.

Further, the account management system 102 may, in various embodiments, generate, assign, and/or manage a unique and federated identifier token for an end user and use the same identifier token when communicating with various different digital asset exchange systems 106. Even further, the account management system 102 may advantageously enable various entities associated with and/or operating digital asset exchange systems 106 to establish various conversion thresholds and/or limits to maintain control over a digital asset supply, value, demand, and/or the like. Further still, the account management system 102 may be configured to execute digital asset conversions and subsequently cause and execute efficient and improved settlement through fiat currency transactions with digital asset exchange systems 106. At least these described technical solutions of various embodiments are provided through the various functions, steps, operations, methods, processes, and/or the like described herein.

Various steps/operations and processes are described herein in reference to an exemplary illustrative scenario that should not be construed to limit the scope of the present disclosure. That is, reference will be made to the exemplary illustrative scenario throughout the present disclosure to further describe the various steps/operations and processes performed in various embodiments. In this exemplary illustrative scenario, an end user of a client device 104 is in ownership of a digital asset user account with a balance of at least twenty-thousand digital asset units of a liability digital asset. Specifically, the digital asset user account has a balance of at least twenty-thousand reward points distributed and managed by a liability holder entity that also manages the digital asset user account. The end user desires to redeem twenty-thousand reward points for fiat currency.

FIG. 4A provides a process 400 for converting a digital asset to fiat currency, such as by initiating a conversion of a digital asset to fiat currency. In various embodiments, the account management system 102 comprises means, such as processing element 205, memories 210, 215, network interface 220, and/or the like, for performing each of the steps/operations of process 400 to initiate a conversion of a digital asset to fiat currency.

Process 400 comprises step/operation 401. In one embodiment, process 400 may begin with, may be initiated by, and/or the like step/operation 401. Step/operation 401 comprises receiving a conversion rate request indicating a digital asset, the request originating from a client device 104 associated with an end user. For example, the account management system 102 may receive a conversion rate request originating from a client device 104 via a network interface 220. In various embodiments, the conversion rate request may be an API call, query, request, and/or the like transmitted by the client device 104. In the exemplary illustrative scenario, the end user indicates via the client device 104 of the end user's desire to redeem twenty-thousand reward points, and as such, the conversion rate request may indicate at least the digital asset (e.g., the reward points), the liability holder entity managing the digital asset, the number of digital asset units, and/or the like.

Process 400 may comprise step/operation 402. Step/operation 402 comprises determining one or more conversion behavior cohorts for the end user. In various embodiments, a conversion behavior cohort may be determined based at least in part on demographic information and/or other information associated with the end user. For example, the account management system 102 may determine or identify an age group conversion behavior cohort based at least in part on the age of the end user, a gender conversion behavior cohort based at least in part on the gender of the end user, a location conversion behavior cohort based at least in part on the residence of the end user, and/or the like. In any such instances, a conversion behavior cohort may be composed of different end users with similar demographic information with the end user. Accordingly, the account management system 102 may store, retrieve, and/or have access to demographic information and/or other information associated with the end user. In some embodiments, the account balance data associated with a digital asset user account or a fiat currency user account associated with the end user may store or record demographic information and/or other information associated with the end user.

Additionally or alternatively, a conversion behavior cohort for the end user may be determined and identified based at least in part on the account information, status, activity history, and/or the like of a digital asset user account and/or a fiat currency user account associated with the end user. In some instances, various digital asset user accounts associated with various different end users may be associated or assigned with different statuses, levels, tiers, and/or the like by a digital asset exchange system managing the various digital asset user accounts, such statuses being based at least in part on various factors such as history, a number of purchases made (e.g., loyalty), membership fees, and/or the like. Accordingly, a conversion behavior cohort may be composed of other end users with digital asset user accounts with the same status, level, tier, and/or the like as the end user. Likewise, a conversion behavior cohort may be determined and identified based at least in part on activity history; for example, a conversion behavior cohort may be composed of end users who have not made a transaction using a fiat currency user account. It will be understood that other conversion behavior cohorts for an end user may be determined based at least in part on various different criteria, and that one or more conversion behavior cohorts may be determined for the end user.

Accordingly, the account management system 102 may determine one or more conversion behavior cohorts for the end user based at least in part on account balance data objects corresponding to a digital asset user account and/or a fiat currency user account associated with the end user. For example, an account balance data object may describe a status, level, tier, and/or the like of a corresponding user account and may also describe the activity history of the corresponding user account. As such, the account management system 102 may store, retrieve, and/or have access to various account balance data objects for determining one or more conversion behavior cohorts for the end user.

Process 400 may then comprise step/operation 403, which comprises generating a conversion behavior analytics data object describing (i) historical behavior of the determined one or more conversion behavior cohorts, and (ii) historical behavior of the end user. In various embodiments, the conversion behavior analytics data object may comprise an indication of an aggregated number of conversions previously executed by a conversion behavior cohort and/or the end user, an indication of conversions previously executed for a conversion behavior cohort and/or the end user within a particular time period, various conversion rates at which previous conversions were executed, historical conversion rate trends, and/or the like. In general then, the conversion behavior analytics data object may at least indicate and/or suggest conversion rates at which a conversion behavior cohort and/or the end user have historically requested digital asset conversions and/or at which previous conversions were executed. In various embodiments, the conversion behavior analytics data object may comprise predictive indications related to the execution of digital asset conversions, such as a probability of whether the end user would execute a digital asset conversion at a particular conversion rate, for example. As such, the conversion behavior analytics data object may be generated based at least in part on various predictive models, optimization models, classification models, neural network models, supervised or unsupervised machine learning models, and/or the like.

Process 400 comprises step/operation 404, which includes generating and transmitting a conversion rate API query such that a digital asset exchange system 106 receives the conversion rate API query. In various embodiments, the conversion rate API query comprises a unique and federated identifier token associated with the end user and the conversion behavior analytics data object. In general, the conversion rate API query may be configured to cause the digital asset exchange system 106 to generate, determine, and/or provide a conversion rate for the digital asset. It may then be appreciated that the conversion API query may indicate the digital asset for which a conversion rate is requested. In various embodiments, the conversion rate API query may comprise a request for historical conversion rates. For example, a conversion rate API query indicating a cryptocurrency digital asset may be configured to cause the digital asset exchange system 106 to at least provide historical conversion rates for the cryptocurrency digital asset over a configurable past time period.

In various embodiments, the conversion rate API query comprises an identifier token associated with the end user and configured to uniquely identify the end user for the digital asset exchange system 106 and/or to identify a digital asset user account associated with the end user. For example, the identifier token may comprise names of the end user, a birthdate, Social Security number, contact information (e.g., an e-mail address, a phone number) and/or other personal identifying information. For example, the identifier token may comprise various account identifiers for the digital asset user account. In some instances, the identifier token may comprise a distributed ledger public key value and/or a cryptocurrency address in order to identify a digital asset user account for a cryptocurrency exchanged via a distributed ledger. In various embodiments, the identifier token may be and/or may comprise a GUID, a UIUD, a hash or cryptographic value of user information or credentials, and/or the like.

In some instances, the digital asset user account is managed and/or custodied by the entity (e.g., a liability holder entity that manages and/or custodies a digital asset user account for liability digital assets) associated with the digital asset exchange system 106 and may be associated with identifiers internal to the digital asset exchange system 106, which may be unrecognized and inaccessible by the account management system 102. Accordingly, the identifier token associated with the end user may be configured to cause the digital asset exchange system 106 identify a custodied digital asset user account. For example, the identifier token may be established based at least in part on single sign-on (SSO) authentication techniques and/or methods. As such, various embodiments of the present disclosure provide technical advantages by enabling an end user to request conversions of digital asset units of a digital asset user account via an account management system 102 that may not necessarily manage or be in custody of the digital asset user account.

Furthermore, the identifier token associated with the end user may be federated for various different digital asset exchange systems 106. In various embodiments, the same identifier token associated with the end user may be used to identify a first digital asset user account managed and/or custodied by a first digital asset exchange system 106, as well as to identify a second digital asset user account managed and/or custodied by a second digital asset exchange system 106. Thus, the identifier token may be established based at least in part on SSO authentication techniques and/or methods for different digital asset exchange systems 106. In various embodiments, the account management system 102 is configured to provide the identifier token associated with the end user to a particular digital asset exchange system 106 to identify a particular digital asset user account without compromising the authentication, credentials, identifiers, and/or the like for other digital asset user accounts managed by other digital asset exchange systems 106. It will be appreciated then that additional technical advantages are provided here by reducing, compressing, minimizing, and/or the like the amount of data needed to identify an end user for various different digital asset exchange systems 106.

In one embodiment, step/operation 405 may follow step/operation 404. Step/operation 405 comprises receiving a conversion rate API response comprising a conversion rate for the digital asset and originating from the digital asset exchange system 106. For example, the conversion rate API response may be a response to the conversion rate API query transmitted by the account management system 102 in step/operation 404. In various embodiments, the conversion rate API response comprises historical, indicative, current, and/or real-time conversion rates for the digital asset. In various embodiments, the conversion rate API response may further indicate an execution time period for which a current conversion rate is valid. For example, the digital asset exchange system 106 may determine a conversion rate for an execution time period and indicate that the digital asset exchange system 106 will engage in a conversion of the digital asset based at least in part on the conversion rate only within the execution time period.

In various embodiments, the conversion rate API response comprises one or more conversion rates for the digital asset and one or more fiat currencies. For example, a first conversion rate may indicate the value of the digital asset with respect to US dollars, while a second conversion may indicate the value of the digital asset with respect to EU euros. In various other embodiments, the conversion rate API query may indicate a specific fiat currency, and the conversion rate API response may accordingly comprise a conversion rate for the digital asset and the indicated fiat currency. For example, the end user may have selected a specific fiat currency to receive in the digital asset conversion.

In some instances, the conversion rate for the digital asset may be dynamic and/or predictive. For example, the conversion rate for the digital asset may be determined (e.g., by the digital asset exchange system 106) based at least in part on the end user's historical and current conversion behavior provided via the conversion behavior analytics data object. In some examples, the digital asset exchange system 106 uses various predictive models, optimization models, machine learning models, and/or the like to determine a conversion rate for the digital asset using the conversion behavior analytics data objects.

As discussed, the digital asset exchange system 106 may determine a dynamic conversion rate for the digital asset, the conversion rate for the digital asset being based at least in part on the end user's (or the cohort behavior cohort of the end user) recent or current conversion and/or transaction behavior. For example, the digital asset exchange system 106 may determine a first conversion rate for the digital asset when the end user has requested and/or executed more than a threshold number of digital asset conversions or other transactions with an entity associated with the digital asset exchange system 106 within a configurable time period (e.g., the past week, the past month, the past year), and may determine a second conversion rate for the digital asset when the end user has requested and/or executed less than the threshold number of digital asset conversions or other transactions within the configurable time period. Thus, the digital asset exchange system 106 may train and use various models to determine (e.g., based at least in part on extrapolation, regression, prediction, and/or the like) a conversion rate for the digital asset based at least in part on dynamic user activity or behavior (of the end user and/or the conversion behavior cohort of the end user).

As also discussed, the conversion rate determined by the digital asset exchange system 106 may additionally or alternatively be predictive. Specifically, the digital asset exchange system 106 may determine a conversion rate with the highest predicted likelihood that the end user will approve the conversion rate and request that the conversion be executed for the conversion rate. Accordingly, the digital asset exchange system 106 may train the various models (e.g., in a supervised manner, semi-supervised manner, and/or unsupervised manner) using data describing whether or not the end user (or the conversion behavior cohort of the end user) requested execution of a conversion for a particular conversion rate, such data being included in the conversion behavior analytics data object. The digital asset exchange system 106 may then use the various trained models to determine a conversion rate likely to be accepted by the end user. For example, the digital asset exchange system 106 may determine that the end user is more likely to accept a first conversion rate where one digital asset unit is worth USD $20 than a second conversion rate where one digital asset unit is worth USD $5. In various embodiments, the digital asset exchange system 106 may train and use various predictive models, optimization models, machine learning models, and/or the like to predict a maximal conversion rate (e.g., lowest number of fiat currency units for one digital asset unit, highest number of digital asset units for one fiat currency unit) that the end user is likely to accept. Thus, in various embodiments, various predictive models, optimization models, machine learning models, and/or the like may be trained to generate (e.g., output) a dynamic conversion rate likely to be accepted by the end user upon being provided with at least a conversion behavior analytics data object.

In various embodiments, the conversion rate API response may be received from the digital asset exchange system 106, may be received originating from the digital asset exchange system 106, and/or may be received from another entity associated with the entity associated with the digital asset exchange system 106. In an example scenario, a liability holder entity distributing and/or accepting a liability digital asset may be associated with a third-party entity that manages the economy of the liability digital asset, in part by determining conversion rates for various end users and/or cohorts of end users. As such, the conversion rate API response may be received originating from such a third-party entity (e.g., instead of the entity associated with the digital asset exchange system 106).

In various embodiments, the conversion rate API response comprises an account balance data object corresponding to the digital asset user account. In various embodiments, the conversion rate API response is configured to cause the account management system 102 to generate and/or update an account balance data object corresponding to the digital asset user account in memory 210, 215 of the account management system 102. As such, the account management system 102 may be aware of the current digital asset unit balance of the digital asset user account after receiving the conversion rate API response.

Process 400 comprises step/operation 406, which comprises providing the conversion rate for the digital asset to the client device 104. In various embodiments, the conversion rate is provided in an API response to a conversion rate request originating from the client device 104 (e.g., in step/operation 401). In various embodiments, the conversion rate may be provided with instructions causing the client device 104 to provide the conversion rate to the end user. For example, the client device 104 may be caused to provide the conversion rate in a notification to the end user. As another example, the client device 104 may display the conversion rate to the end user via a user interface. In the exemplary illustrative scenario, the end user is notified of the conversion rate by an indication of how many fiat currency units will be received for the redemption of twenty-thousand reward points, which specifically is USD $160 at the conversion rate of one-hundred-twenty-five reward points to one US dollar. In another example scenario, the end user may be notified of a conversion rate by an indication of how many fiat currency units are equal in value to one digital asset unit. For example, it may be indicated that one reward point is equal to or worth the same as USD $2. Accordingly, in various scenarios or instances, the conversion rate may be fractional with respect to the fiat currency or with respect to the digital asset. Further, the conversion rate may be provided to the end user via the client device 104 from a digital asset perspective (e.g., a number of fiat currency units equal in value to one digital asset unit) and/or from a fiat currency perspective (e.g., a number of digital asset units equal in value to one fiat currency unit).

At step/operation 407, the account management system 102 determines whether a conversion execution request originating from the client device 104 has been received. In various embodiments, the conversion execution request may be transmitted by the client device 104 based at least in part on user input. The conversion execution request may indicate the end user's approval of the conversion rate for the digital asset provided to the client device 104. In various embodiments, the conversion execution request may comprise at least one of (i) a number of fiat currency units to credit, or (ii) a number of digital asset units to debit. In the exemplary illustrative scenario, the conversion execution request is an indication that the end user has reviewed and has confirmed the conversion of twenty-thousand reward points for USD $160.

If the account management system 102 determines that a conversion execution request originating from the client device 104 has not been received, step/operation 408 may be performed. That is, the account management system 102 may determine whether one or more configurable threshold time periods have elapsed. In various embodiments, the one or more configurable threshold time periods may represent a time period within which the conversion rate for the digital asset provided to the client device 104 is accurate and/or valid for the execution of a conversion. For example, the one or more configurable threshold time periods may comprise a configurable refresh time period representing a temporal resolution at which a conversion rate for the digital asset may vary. Thus, the account management system 102 may determine whether a configurable refresh time period has elapsed to thereby determine whether the conversion rate for the digital asset provided to the client device 104 may have changed, whether the digital asset may have changed in value since providing the conversion rate to the client device 104, and/or the like.

Likewise, the one or more configurable threshold time periods may comprise a configurable execution time period representing a time period within which the previously retrieved and provided conversion rate for a digital asset may be valid for the execution of a conversion of the digital asset. For example, the digital asset exchange system 106 may indicate (e.g., in the conversion rate API response) a time period for which the conversion rate is valid. It may be appreciated that for a digital asset with volatile value (e.g., a cryptocurrency), a configurable execution time period may be longer in duration than a configurable refresh time period, such that conversions and other transactions with such volatile digital assets are executed based at least in part on a previously agreed-upon conversion rate or value. For example, in some embodiments, a configurable execution time period is five minutes, ten minutes, fifteen minutes, and/or the like, while a configurable refresh time period is 30 seconds, 60 seconds, 90 seconds, 180 seconds, and/or the like.

Accordingly, if the account management system 102 determines that one or more configurable time periods (e.g., a refresh time period, an execution time period) have elapsed, the account management system 102 may perform at least steps/operations 404, 405, and 406 again to retrieve and provide an updated, current, or real-time conversion rate. Subsequent to providing an updated conversion rate, the account management system 102 may again determine whether a conversion execution request originating from the client device 104 has been received and whether one or more configurable time periods have elapsed again. Otherwise, as illustrated in FIG. 4A, the account management system 102 may continue to determine whether a conversion execution request originating from the client device 104 has been received, at step/operation 407.

However, if the conversion execution request is received at step/operation 407, the account management system 102 may execute the conversion of the digital asset to the fiat currency as indicated, described, and requested in the conversion execution request. In various embodiments, the conversion execution request may indicate a specific fiat currency (e.g., US dollars, EU euros, and/or the like) for the conversion of the digital asset. FIG. 4B provides a process 410 for converting the digital asset to the fiat currency, such as by executing a conversion of the digital asset to the fiat currency. In various embodiments, the account management system 102 comprises means, such as processing element 205, memories 210, 215, network interface 220, and/or the like, for performing each of the steps/operations of process 410 to execute the conversion of the digital asset to the fiat currency.

As illustrated in FIG. 4B, process 410 comprises step/operation 411, and in one embodiment, process 410 may begin with, may be initiated by, and/or the like step/operation 411. Step/operation 411 comprises determining a number of digital asset units and a number of fiat currency units for the digital asset conversion based at least in part on the conversion rate. As previously described, at least one of (i) the number of fiat currency units to credit, or (ii) the number of digital asset units to debit may be indicated by the conversion execution request. For example, the at least one of (i) the number of fiat currency units to credit, or (ii) the number of digital asset units to debit may have been specified by the end user of the client device 104 via user interaction with a user interface. In various embodiments, a respective other one of (i) the number of fiat currency units to credit, or (ii) the number of digital asset units to debit may be determined based at least in part on the conversion rate for the digital asset. In other embodiments, the conversion execution request comprises both (i) the number of fiat currency units to credit and (ii) the number of digital asset units to debit. In such embodiments, the account management system 102 may verify that each number in relation to the respective other is accurate and satisfies the conversion rate of the digital asset.

Having determined both (i) the number of fiat currency units to credit and (ii) the number of digital asset units to debit, the account management system 102 may determine whether the digital asset conversion satisfies various conversion thresholds and/or limits, which may be established and configured by the digital asset exchange system 106. In various embodiments, the digital asset exchange system 106 may establish and configure various conversion threshold and/or limits that may manage and/or maintain the value or economy of the digital asset. For example, the digital asset exchange system 106 may establish and configure a conversion threshold preventing an end user from converting over a threshold number of digital asset units. In some instances, the digital asset exchange system 106 may establish and configure a cohort-based conversion threshold preventing a cohort of end users from converting a total number of digital asset units. In other instances, a conversion threshold is a threshold number of digital asset conversions that may be executed within a configurable time period.

Thus, in various embodiments, the account management system 102 may evaluate whether the digital asset conversion satisfies various conversion thresholds and/or limits. For example, the account management system 102 may determine a total number of digital asset units debited over the current time period including the digital asset units to debit for the present digital asset conversion and evaluate whether the total number of digital asset units debited/to be debited satisfies a threshold. The account management system 102 may additionally or alternatively determine whether a total number of digital asset conversions executed including the present digital asset conversion satisfies a threshold.

In some embodiments, the account management system 102 trains and uses various predictive models, optimization models, machine learning models, and/or the like to determine whether a significant change in digital asset unit supply or distribution is likely based at least in part on the present digital asset conversion. That is, the account management system 102 may determine whether a "run on points" may occur where large quantities of digital asset units are being converted, dramatically changing the digital asset unit distribution and potentially causing fiat currency shortages or deficits. Thus, the account management system 102 may predict the likelihood of significant changes in digital asset unit supply or distribution based at least in part on the present digital asset conversion and/or other conversion requests received in a current time period.

In some embodiments, the account management system 102 may communicate with the digital asset exchange system 106 to determine whether a "run on points" may occur or predict the likelihood of a significant change in digital asset unit supply or distribution. For example, the account management system 102 may indicate to the digital asset exchange system 106 that a conversion execution request originating from the client device has been received and the determined number of digital asset units to debit. The digital asset exchange system 106 may use various trained models and the indication from the account management system 102 to determine a likelihood of a significant change in digital asset unit supply or distribution.

In various embodiments, the account management system 102 may also establish various conversion thresholds and/or limits (e.g., for compliance with various rules and regulations). For example, the account management system 102 may limit the number of conversions that may be executed within a time period and/or may only execute conversions within a specific time period (e.g., transaction hours). Various other conversion thresholds and/or limits may be configured to monitor or detect fraudulent transactions. For example, the account management system 102 may limit the number of conversions executed for a specific end user within a specific time period.

If the account management system 102 determines that the digital asset conversion (e.g., the number of fiat currency units to credit and the number of digital asset units to debit) does not satisfy the conversion thresholds and/or that a significant change in digital asset unit supply or distribution is likely, the digital asset conversion may be modified. For example, the number of digital asset units to debit may be lowered to satisfy the conversion thresholds, and the number of fiat currency units to credit may be modified based at least in part on the conversion rate of the digital asset and the lowered number of digital asset units to debit. In various embodiments, modifying the digital asset conversion comprises notifying the end user (e.g., via the client device 104) and receiving approval of the modified digital asset conversion. In some instances, the end user may choose to cancel the digital asset conversion after being notified that the digital asset conversion did not satisfy the conversion thresholds. In some embodiments, the account management system 102 may modify the digital asset conversion by canceling the digital asset conversion and accordingly notifying the end user (e.g., via the client device 104) that the digital asset conversion was canceled for not satisfying the conversion thresholds. In some embodiments, the account management system 102 receives a request from the digital asset exchange system 106 to cancel the requested digital asset conversion.

Otherwise, the account management system 102 may continue to execute the digital asset conversion and may identify a digital asset user account and a fiat currency user account each associated with the end user, at step/operation 414. In various embodiments, the account management system 102 may select a digital asset user account from one or more digital asset user accounts associated with the end user and a fiat currency user account from one or more fiat currency user accounts associated with the end user. In various embodiments, the account management system 102 may receive an indication (e.g., the conversion execution request) originating from the client device 104 of a particular digital asset user account and/or a particular fiat currency user account selected by the end user.

In various embodiments, the account management system 102 determines whether the digital asset unit balance of the digital asset user account is sufficient for the digital asset conversion, at step/operation 415. Specifically, the number of digital asset units to debit may be compared to the digital asset unit balance of the digital asset user account. The digital asset unit balance of the digital asset user account may be accessible and/or retrieved from an account balance data object corresponding to the digital asset user account. In some embodiments, the digital asset exchange system 106 may store the account balance data object corresponding to the digital asset user account, and the account management system 102 may determine or retrieve the digital asset unit balance of the digital asset user account based at least in part on communicating with the digital asset exchange system 106.

If the digital asset unit balance of the digital asset user account is insufficient or deficient (e.g., less than) the number of digital asset units to debit, then step/operation 416 may be performed, in various embodiments. Step/operation 416 comprises generating and transmitting a notification of insufficient balance to the client device 104. As such, the end user may be notified that the conversion may not be executed due to the insufficient or deficient digital asset unit balance of the digital asset user account. In some embodiments, step/operation 416 comprises canceling the conversion and notifying the end user of the cancelation. In other embodiments, step/operation 416 comprises enabling the end user to modify the conversion, such as by providing a user interface in which the end user may specify a new number of digital asset units to debit.

Otherwise, step/operation 417 may be performed, in various embodiments. Step/operation 417 comprises generating and transmitting a conversion execution API query to the digital asset exchange system 106. In various embodiments, the conversion execution API query is configured to cause the number of digital asset units to debit to be debited from the digital asset user account. In instances where the digital asset is a liability digital asset (e.g., loyalty points, reward points), the digital asset exchange system 106 may update the digital asset unit balance of the digital asset user account to reflect a debit, or subtraction, of the number of digital asset units to debit. In other instances where the digital asset is a cryptocurrency digital asset (e.g., Bitcoin, Ethereum, Ripple, Litecoin, Dogecoin), the digital asset exchange system 106 may execute a cryptocurrency transaction (e.g., an on-chain cryptocurrency transaction) such that cryptocurrency digital asset units associated with the distributed ledger public key value and/or cryptocurrency address associated with the end user are transferred from the distributed ledger public key value and/or a cryptocurrency address (e.g., to an operating cryptocurrency address of the digital asset exchange system 106). For example, the digital asset exchange system 106 may commit an on-chain transaction record data object to a distributed ledger computing platform to execute the cryptocurrency transaction. In even further instances, the digital asset may be a single-unit digital asset, such as an NFT, and the digital asset exchange system 106 may debit the single-unit digital asset from the digital asset user account by changing the ownership of the single-unit digital asset, or transferring the single-unit digital asset to another digital asset user account associated with another end user. Thus, in various embodiments, debiting a number of digital asset units from the digital asset user account may comprise transferring the number of digital asset units to another account, another end user, the digital asset exchange system 106, and/or the like. In the exemplary illustrative scenario, the liability holder entity receives the request for the conversion of twenty-thousand reward points for USD $160. The liability holder entity accordingly verifies the conversion request and debits twenty-thousand reward points from the digital asset user account.

Process 410 may further comprise step/operation 418, which comprises receiving a confirmation originating from the digital asset exchange system 106 indicating that the digital asset user account was debited by a debited number of digital asset units. In various embodiments, the confirmation comprises additional information, such as a timestamp of the debit and if applicable, a recipient of the debited number of digital asset units.

Process 410 then comprises step/operation 419, which comprises executing a fiat currency transaction between a fiat currency central operating account and the fiat currency user account. In various embodiments, the account management system 102 and/or the entity operating the account management system 102 is associated with one or more fiat currency central operating accounts, each associated with a fiat currency balance, and the account management system 102 is configured to initiate, request, and/or execute fiat currency transactions. In various embodiments, the executed fiat currency transaction involves the transfer of fiat currency units from the account management system 102 and/or the entity operating the account management system 102 to the end user in response to the debiting of digital asset units from the digital asset user account. As such, various embodiments provide technical advantages by enabling the instantaneous, immediate, real-time, and/or the like conversion of digital assets, as the end user receives the resulting fiat currency substantially immediately. It may be understood that the digital asset exchange system 106 and/or the entity associated with the digital asset exchange system 106 (e.g., a liability holder entity) may be ultimately responsible for the payment of fiat currency units as a result of the conversion of digital asset units; however, the account management system 102 may be configured to transfer the fiat currency units in less time or in a more efficient manner. In the exemplary illustrative scenario, the end user receives the USD $160 from the entity operating the account management system 102 instead of the liability holder entity, which enables the end user to receive and/or use the fiat currency sooner or faster.

In various embodiments, the transfer of fiat currency units (e.g., between fiat currency central operating accounts of the account management system 102 and fiat currency user accounts of the end user) may be accomplished in various techniques or systems, such as an electronic funds transfer (EFT), a wire transfer, an Automated Clearing House (ACH) transfer, a Society for Worldwide Interbank Financial Telecommunication (SWIFT) transfer or an international money transfer, a Single Euro Payments Area (SEPA) transfer, and/or the like. As aforementioned, the number of fiat currency units transferred in the transaction may be determined based at least in part on the conversion rate of the digital asset. In some instances, the fiat currency user accounts of the end user may be externally custodied, such as by an external banking institution operating an external banking system. As such, the account management system 102 may cause fiat currency units to be transferred into an internal/external fiat currency user account by generating and transmitting an API query or call to an external banking system managing the fiat currency user account. In various embodiments, executing the fiat currency transaction between the fiat currency central operating account and the fiat currency user account comprises receiving a confirmation (e.g., originating from an external banking system) that the fiat currency transaction was executed.

FIG. 4C provides a process 420 for converting the digital asset to the fiat currency, such as by concluding a conversion of the digital asset to the fiat currency. Process 420 comprises additional steps/operations that may be performed for executing the conversion of the digital asset to the fiat currency. In various embodiments, the account management system 102 comprises means, such as processing element 205, memories 210, 215, network interface 220, and/or the like, for performing each of the steps/operations of process 420 to conclude the digital asset conversion.

As shown in FIG. 4C, process 420 may comprise step/operation 421, which involves updating a first account balance data object corresponding to the digital asset user account and a second account balance data object corresponding to the fiat currency user account. In various embodiments, the account management system 102 may store account balance data objects corresponding to various different accounts, such as in memories 210, 215. In such embodiments, the account management system 102 may update the account balance data objects to reflect the debiting of digital asset units from the digital asset user account and the crediting of digital asset units to the fiat currency user account. In some embodiments, updating each account balance data object comprises generating and storing a transaction record data object associated with and/or within an account balance data object. For example, the account management system 102 may generate a transaction record data object describing the debiting of digital asset units (e.g., the number of digital asset units debited, the time of debiting, identifiers for the digital asset user account, identifiers for the end user associated with the digital asset user account) and associate and/or store the transaction record data object with the first account balance data object corresponding to the digital asset user account. Similarly, the account management system 102 may generate a transaction record data object describing the crediting of fiat currency units (e.g., the number of fiat currency units credited, the time of crediting, identifiers for the fiat currency user account, identifiers for the end user associated with the fiat currency user account) and associate and/or store the transaction record data object with the second account balance data object corresponding to the fiat currency user account. Accordingly, a transaction history or historical account activity may be provided via an account balance data object.

In various embodiments, multiple different systems (e.g., one or more account management systems 102, one or more client devices 104, one or more digital asset exchange systems 106) may individually store an account balance data object for a digital asset user account and/or an account balance data object for a fiat currency user account. In such embodiments, the account management system 102 may relay, broadcast, transmit, and/or the like a transaction record data object to other different systems, such that the other systems are aware of the debiting of digital asset units from the digital asset user account and the crediting of fiat currency units to the fiat currency user account. For example, the account balance data object for the digital asset user account may be a distributed ledger, and the account management system 102 commits a transaction record data object describing the debiting of digital asset units to the distributed ledger. For example, the account balance data object for the fiat currency user account may be a distributed ledger, and the account management system 102 commits a transaction record data object describing the crediting of fiat currency units to the distributed ledger.

Process 420 may further comprise step/operation 422. Step/operation 422 comprises generating and transmitting a notification of execution of the conversion to the client device. In various embodiments, the notification may be any communication (e.g., telephonic conversion, text message, e-mail, push notification, user interface) indicating to the end user that the conversion of the digital asset to the fiat currency was executed and completed. In various embodiments, the notification comprises additional information regarding the digital asset conversion, such as identifiers for the digital asset user account and/or the fiat currency user account, the number of digital asset units finally debited, and/or the number of fiat currency units finally credited.

As shown in FIG. 4C, process 420 comprises step/operation 423. Step/operation 423 comprises executing a fiat currency transaction between the fiat currency central operating account and a fiat currency account associated with the digital asset exchange system 106. In various embodiments, the fiat currency transaction involves the transfer of fiat currency units originating from the entity associated with the digital asset exchange system 106 to the entity operating the account management system 102. The fiat currency transaction (e.g., the second fiat currency transaction) between the fiat currency central operating account associated with the account management system 102 and the fiat currency account associated with the digital asset exchange system 106 occurs subsequent to the fiat currency transaction (e.g., the first fiat currency transaction) between the fiat currency central operating account and the fiat currency user account. As previously mentioned, the digital asset exchange system 106 is ultimately responsible for the payment of fiat currency units for the conversion of digital asset units, and thus, the fiat currency transaction may be a settlement by the entity associated with the digital asset exchange system 106 for the entity associated with the account management system 102 paying the end user in the first fiat currency transaction. In various embodiments, executing the fiat currency transaction between the account management system 102 and the digital asset exchange system 106 comprises receiving confirmation (e.g., originating from the digital asset exchange system 106, originating from an external banking system associated with an external banking entity or institution) that the fiat currency transaction was executed.

Thus, the fiat currency transaction executed in step/operation 423 may be a settlement of fiat currency units, or a fiat currency settlement. In various embodiments, the fiat currency settlement involves the transfer of at least the number of fiat currency units credited to the fiat currency user account and originating from the fiat currency central operating account of the account management system 102. As aforementioned, the transfer of fiat currency units may involve various techniques or systems, such as EFT, a wire transfer, an ACH transfer, a SWIFT or international money transfer, a SEPA transfer, and/or the like. In various embodiments, execution of the fiat currency settlement is responsive to a settlement request transmitted and originating from the account management system 102 and received by the digital asset exchange system 106. For example, the settlement request transmitted by the account management system 102 may indicate the number of fiat currency units to transfer in the fiat currency settlement. In the exemplary illustrative scenario, the liability holder entity then transfers USD $160 to the entity operating the account management system 102 to settle the USD $160 transferred by the entity operating the account management system 102 to the end user.

In various embodiments, the fiat currency settlement involves the transfer of a number of fiat currency units credited to a plurality of fiat currency user accounts by the account management system 102 in a plurality of digital asset conversions within a configurable time period. For example, the settlement request transmitted by the account management system 102 may indicate a summed or total number of fiat currency units credited to various fiat currency user accounts during a day, and a fiat currency settlement between the account management system 102 and the digital asset exchange system 106 may be executed on a daily basis. However, in such an instance, the settlement request may include line item details for each transfer of fiat currency units and/or each conversion executed within the configurable time period.

Thus, in various embodiments, the execution of a fiat currency transaction between the fiat currency central operating account and the fiat currency account associated with the digital asset exchange system 106 may occur based at least in part on a configurable settlement time period. As such, various technical advantages are provided. For example, network traffic and bandwidth are reduced by executing one fiat currency settlement for multiple digital asset conversions. Furthermore, less fiat currency transaction processing time is spent, as multiple fiat currency settlements that would be individually processed are aggregated and condensed into one processed transaction.

In various embodiments, a digital asset conversion may be cancelled, and thus, a fiat currency transaction or settlement between the account management system 102 and the digital asset exchange system 106 may not be executed. In such instances, the fiat currency transaction between the fiat currency central operating account and the fiat currency user account may be canceled, or another fiat currency transaction between the fiat currency central operating account and the fiat currency user account may be executed to return a number of fiat currency units to the fiat currency central operating account. The account management system 102 may additionally cause the number of digital asset units debited from the digital asset user account to be returned and credited to the digital asset user account (e.g., by transmitting a conversion cancellation API query to the digital asset exchange system 106).

Process 420 may further comprise step/operation 424, which comprises updating the conversion behavior analytics data object describing historical behavior of the end user and/or historical behavior of conversion behavior cohort of the end user based at least in part on the executed digital asset conversion. In various embodiments, updating the conversion behavior analytics data object comprises recording the execution of the digital asset conversion, the time of execution of the digital asset conversion, the conversion rate used for the execution of the digital asset conversion, demographic information and/or other information associated with the end user, and/or the like. In various embodiments, various predictive models, optimizations models, classification models, neural network models, supervised or unsupervised machine learning models, and/or the like may be updated, retrained, reconfigured, and/or the like with information for the executed digital asset conversion.

Having thus described various functions, steps/operations, methods, processes, and/or the like for converting digital assets to fiat currency, further steps/operations are described in the context of various user interfaces. In various embodiments, the user interfaces provided and described in the present disclosure are configured to be provided via a client device 104 (e.g., via a display 316). In other embodiments, the user interfaces may be provided via the account management system 102.

Figure 5:
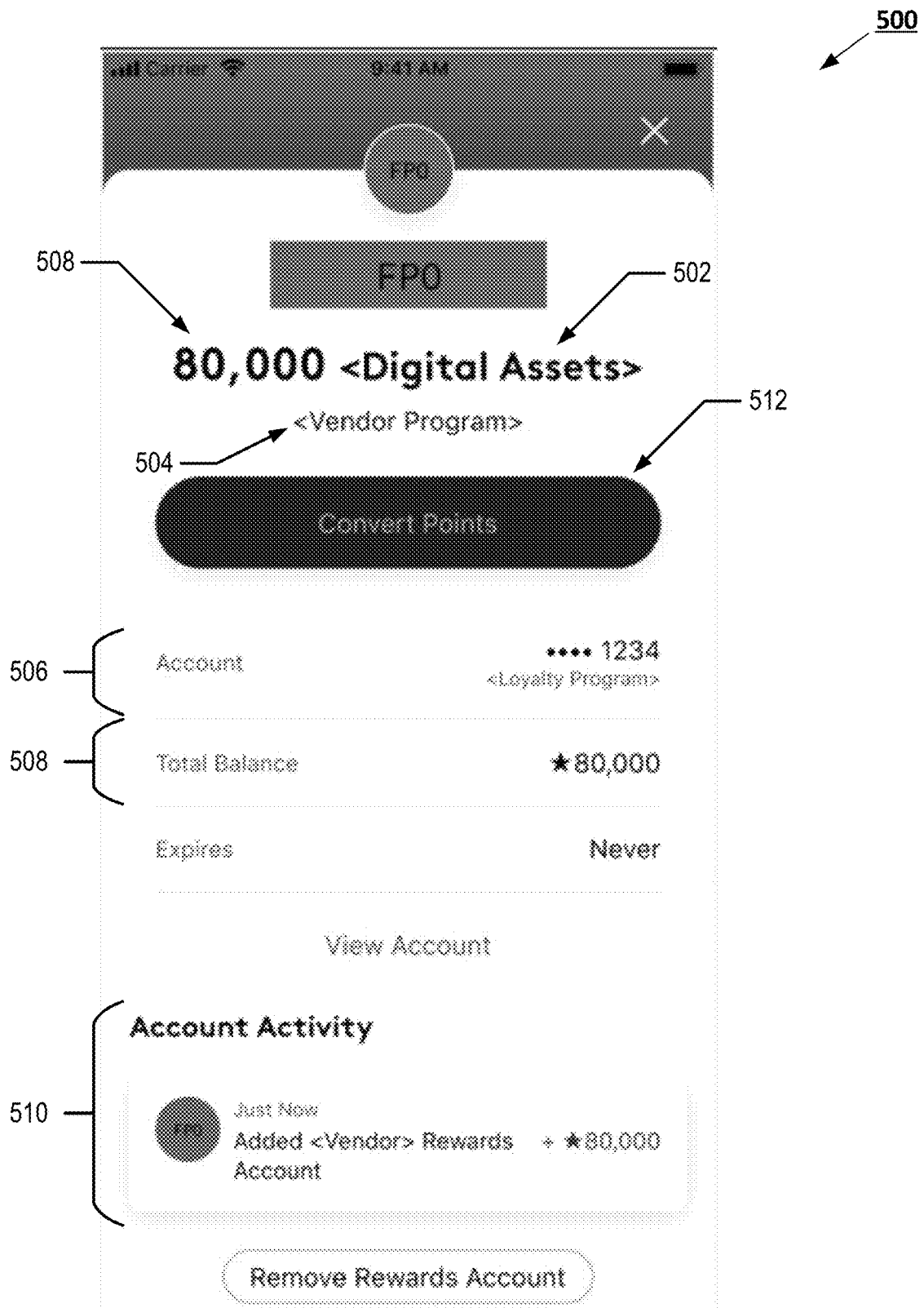

FIG. 5 provides a user interface 500 configured to enable an end user to request the initiation of a conversion of a digital asset to fiat currency, which may implicitly comprise a conversion rate request (e.g., a conversion rate request received by the account management system 102 in step/operation 401). As illustrated in FIG. 5, the user interface 500 may indicate a particular digital asset 502 and information for a digital asset user account 506 associated with the end user operating the client device 104 on which the user interface 500 is displayed. The user interface 500 further indicates or identifies an entity (e.g., a liability holder entity 504) responsible for the distribution and management of the particular digital asset 502 and associated with and/or operating a digital asset exchange system 106.

User interface 500 may also indicate the digital asset unit balance 508, or the number of digital asset units, associated with the digital asset user account 506. In various embodiments, the user interface 500 may be generated using an account balance data object corresponding to the digital asset user account 506 and comprising information for the digital asset user account 506, such as the digital asset unit balance 508 and various identifiers (e.g., account number) for the digital asset user account 506. The account balance data object may be further configured to record historical account activity 510 associated with the digital asset user account 506, and the user interface 500 may indicate such historical account activity 510. For example, in the illustrated embodiment, eighty-thousand units of the digital asset 502 were added to the digital asset unit balance 508 associated with the digital asset user account 506. Each item of the historical account activity 510 may be associated with a timestamp, and the historical account activity 510 may be indicated via the user interface 500 in any manner with each timestamp. It may then be appreciated that the client device 104 generating and displaying the user interface 500 may have access to (e.g., receives from the account management system 102) the account balance data object corresponding to the digital asset user account 506. In various embodiments, the client device 104 may request various information for the user interface 500 (e.g., digital asset unit balance 508, historical account activity 510) from the account management system 102 when generating and/or updating the user interface 500. The account management system 102 may then retrieve such information from an account balance data object corresponding to the digital asset user account 506 and provide such information to the client device 104.

As illustrated in FIG. 5, user interface 500 may comprise a conversion initiation mechanism 512 (e.g., a button labelled "Convert Points"). The conversion initiation mechanism 512 may be configured to be selectable or interactable with by an end user of the client device 104, and the client device 104 may be configured to monitor for user interaction with the conversion initiation mechanism 512. User interaction with the conversion initiation mechanism 512 may represent the desire by an end user to initiate the conversion of the digital asset 502 indicated by the user interface 500, and specifically the conversion of at least some of digital asset units of the digital asset unit balance 508 associated with the digital asset user account 506 indicated by the user interface 500. Responsive to user interaction with the conversion initiation mechanism 512, the client device 104 may generate and transmit a conversion rate request indicating at least the digital asset 502.

Thus, in the exemplary illustrative scenario, the end user may interact with the user interface 500 (e.g., the conversion initiation mechanism 512) to indicate a desire to redeem the twenty-thousand reward points. The end user may also view that the end user owns eighty-thousand reward points via the user interface 500. Even further, the end user may be informed of the historical account activity 510 of the end user via the user interface 500.

Figure 6:
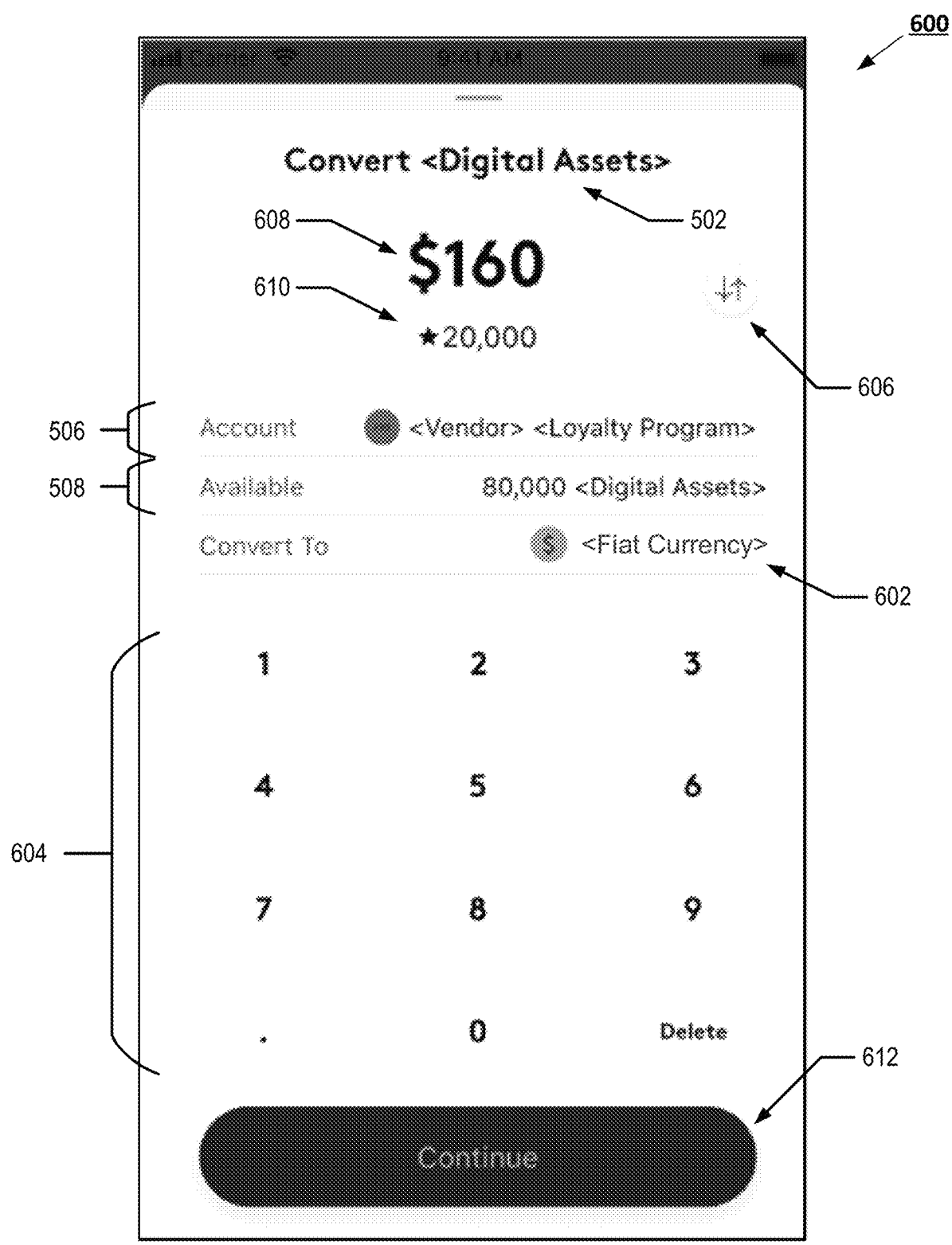

FIG. 6 provides an example user interface 600 for at least displaying the conversion rate for the digital asset 502 to the end user. For example, user interface 600 may be generated and displayed by client device 104 based at least in part on being provided the conversion rate for the digital asset 502 by the account management system 102 (e.g., in step/operation 406 or process 400). For example, user interface 600 may be generated and displayed by client device 104 subsequent to user interaction by the end user with the conversion initiation mechanism 512 in user interface 500.

As illustrated, the user interface 600 may indicate the digital asset 502 for which the conversion is requested and initiated, as well as the digital asset user account 506 and the digital asset unit balance 508 associated with the digital asset user account 506. User interface 600 may also indicate the fiat currency 602 for which units may be credited to the end user for the conversion. In some embodiments, the user interface 600 may be configured to enable the end user to select the fiat currency 602 for credit for the conversion of the digital asset 502. For example, the end user may select to be credited with U.S. dollars, E.U. euros, Chinese yen, English pounds, and/or the like. As such, the user interface 600 may display the fiat currency 602 selected by the end user. In some embodiments, such selection may be indicated to the account management system 102 such that the account management system 102 is aware of a specific fiat currency 602. In various other embodiments, the fiat currency 602 may be based at least in part on a location associated with the end user. For example, the fiat currency 602 may be US dollars if a real-time location (e.g., determined via a global navigation satellite system, global positioning system, and/or the like) is within a region where US dollars are accepted and/or are the main fiat currency. Alternatively, the fiat currency 602 may be US dollars if a residential location or address of the end user is within a region where US dollars are accepted and/or are the main fiat currency.

User interface 600 may further comprise unit specification mechanisms 604 (e.g., numerical buttons, a keypad) and an input selection mechanism 606 (e.g., a button). In various embodiments, the unit specification mechanisms 604 (e.g., numerical buttons, a keypad) are configured to enable an end user to specify one of (i) a number of digital asset units to convert (e.g., to debit from the digital asset user account 506), or (ii) a number of fiat currency units to obtain (e.g., to credit to the end user and/or a fiat currency user account) for a conversion.

In various embodiments, the unit specification mechanisms 604 may be used in conjunction with the input selection mechanism 606 to select whether user input or interaction with the unit specification mechanisms 604 specifies a number of digital asset units or a number of fiat currency units. In the illustrated embodiment, user interface 600 indicates a number of fiat currency units to credit 608 and a number of digital asset units to debit 610. As shown, the number of fiat currency units to credit 608 may be displayed in a format (e.g., font bolding, font color, font size) indicating that the number of fiat currency units to credit 608 was specified by the end user via the unit specification mechanisms 604 and/or that the unit specification mechanisms 604 are presently configured to specify a number of fiat currency units to credit 608 from user input or interaction. Responsive to user interaction with the input selection mechanism 606, however, the number of digital asset units to debit 610 may be displayed in a format indicating that the number of digital asset units to debit 610 was specified by the end user via the unit specification mechanisms 604, and the unit specification mechanisms 604 may be configured to specify a number of digital asset units to debit 610 (instead of a number of fiat currency units to credit 608) from user interaction or input. In the exemplary illustrative scenario then, the end user indicates via user interface 600 that the end user desires to redeem specifically twenty-thousand reward points.

In various embodiments, the client device 104 may have access to an account balance data object corresponding to the digital asset user account 506. In such embodiments, the client device 104 may determine whether the specified number of digital asset units to debit is greater than or within some threshold of the digital asset unit balance 508. For example, the client device 104 may generate a notification or alert via user interface 600 (not explicitly illustrated) that the number of digital asset units specified by the end user via unit specification mechanisms 604 is an invalid number of digital asset units to debit due to an insufficient balance or due to the debit resulting in a digital asset unit balance lower than a threshold.

While an end user may specify one of (i) a number of digital asset units to debit 610, or (ii) a number of fiat currency units to credit 608 (e.g., via the unit specification mechanisms 604 configured by input selection mechanism 606), the respective other one of (i) a number of digital asset units to debit 610 or (ii) a number of fiat currency units to credit 608 may be automatically and in real-time generated based at least in part on the conversion rate for the digital asset 502 (e.g., the conversion rate provided to the client device 104 in step/operation 406). For example, in the illustrated embodiment, the conversion rate for the digital asset 502 may indicate that one-hundred-twenty-five units of the digital asset 502 has a value worth (or equivalent to) one unit of fiat currency (e.g., one U.S. dollar). Accordingly, user interaction with the unit specification mechanisms 604 to specify one-hundred-and-sixty units of fiat currency 602 may cause the user interface 600 to automatically, dynamically, and in real-time indicate twenty-thousand units of digital asset 502 based at least in part on the conversion rate for the digital asset 502. Accordingly, the user interface 600 is configured to provide the conversion rate to the end user of the client device 104 on which the user interface 600 is displayed. In the exemplary illustrative scenario then, the end user is made aware via user interface 600 that the end user may redeem twenty-thousand reward points for USD $160.

In various embodiments, user interface 600 comprises a conversion unit confirmation mechanism 612. The conversion unit confirmation mechanism 612 may be intended to enable an end user to confirm both the number of fiat currency units to credit 608 and the number of digital asset units to debit 610 as indicated by the user interface 600 (and specified by the end user via the unit specification mechanisms 604), and thereby also to enable the end user to confirm the conversion rate for the digital asset 502. In some embodiments then, the conversion unit confirmation mechanism 612 may cause a conversion execution request to be transmitted such that the account management system 102 receives the conversion execution request (e.g., in step/operation 407 of process 400), indicating that the conversion rate for the digital asset 502 has been provided to the end user and has also been approved and confirmed.

Figure 7:
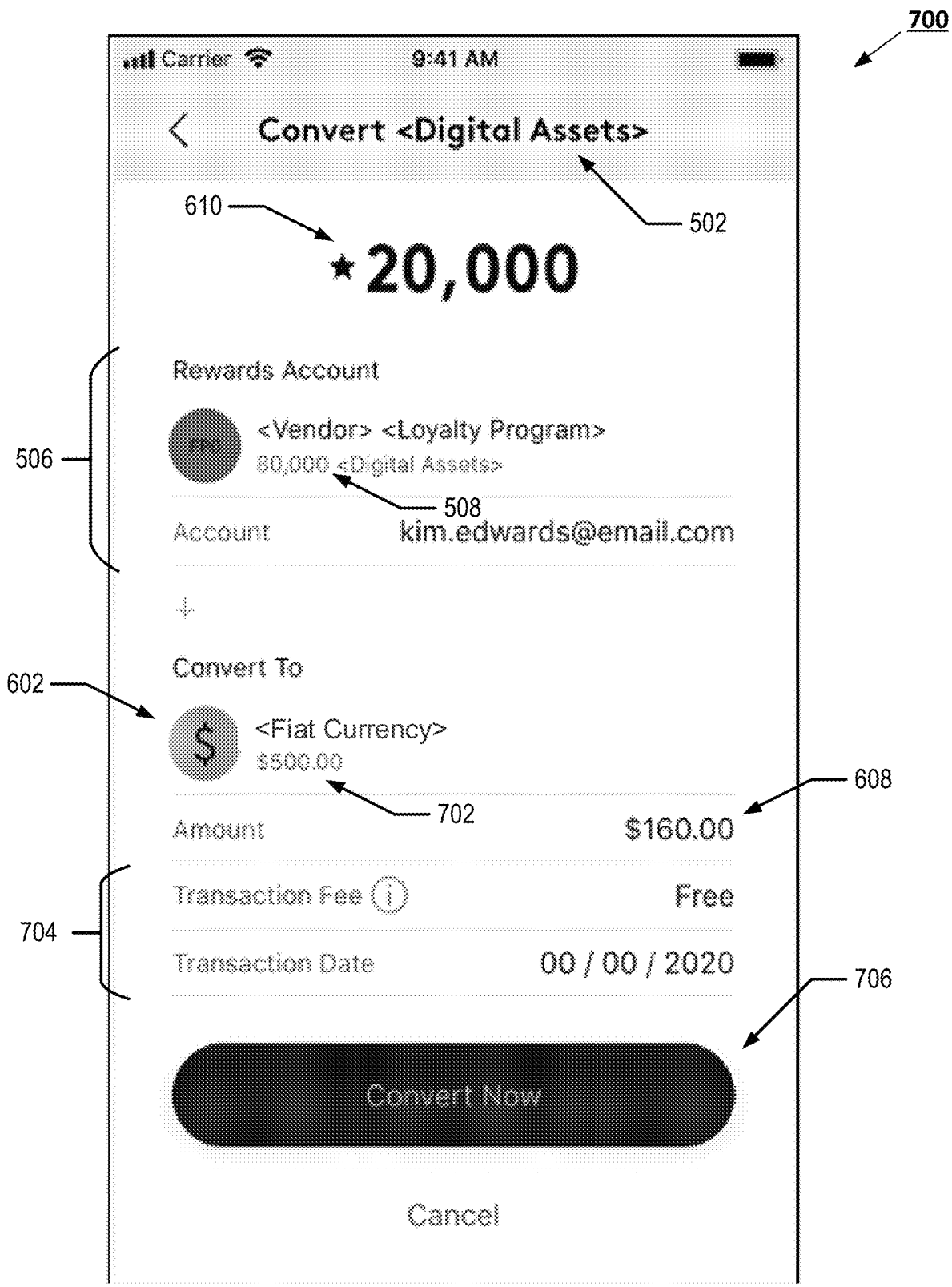

FIG. 7 illustrates a user interface 700 that may be displayed responsive to user interaction with the conversion unit confirmation mechanism 612. For example, the user interface 700 may be configured to enable an end user to review and confirm multiple aspects and details of the conversion of the digital asset 502 to the fiat currency 602 before the execution of the conversion (e.g., before the client device 104 transmits a conversion execution request such that the account management system 102 receives the conversion execution request). For example, the user interface 700 enables the end user to confirm the number of digital asset units to debit 610, the number of fiat currency units to credit 608, any additional fees (e.g., in fiat currency), and various other information before the execution of the digital asset conversion.

User interface 700 may be configured to indicate at least the digital asset user account 506 from which the number of digital asset units to debit 610 will be debited in the conversion. In some embodiments, although not explicitly illustrated, user interface 700 may also indicate the fiat currency user account to which the number of fiat currency units to credit 608 will be credited in the conversion. In various embodiments, the user interface 700 indicates the digital asset unit balance 508 of the digital asset user account 506 at the present moment in time before the conversion, as well as a fiat currency unit balance 702 of the fiat currency user account at the present moment in time before the conversion. Accordingly, the client device 104 may store, retrieve, and/or have access to account balance data objects corresponding to the digital asset user account 506 and the fiat currency user account, in various embodiments. In various other embodiments, the client device 104 may request such information from the account management system 102, which retrieves and provides such information.

User interface 700 may further indicate additional conversion execution information 704, such as any transaction fees and the date of the conversion, in the illustrated embodiment. In various embodiments, the account management system 102 may only execute digital asset conversion within certain time periods (e.g., hours), and as such, user interface 700 may indicate the next available time at which the account management system 102 will execute the requested digital asset conversion. As previously described, the provided conversion rate may only be valid for execution within a configurable time period, or an execution time period. Thus, user interface 700 may indicate to the end user the remaining time of the execution time period to execute the digital asset conversion at the indicated conversion rate.

In various embodiments, user interface 700 comprises conversion execution mechanism 706. The conversion execution mechanism 706 may be intended to enable an end user to confirm all of the information relevant to the conversion as indicated by the user interface 700. Accordingly, the conversion execution mechanism 706 may cause a conversion execution request to be transmitted such that the account management system 102 receives the conversion execution request (e.g., in step/operation 407 of process 400), indicating that the end user desires the conversion to be executed with the provided conversion rate for the digital asset 502. Thus, in the exemplary illustrative scenario, the end user may indicate via user interface 700 that the end user has reviewed and confirmed the conversion rate and still desires to redeem twenty-thousand reward points for USD $160.

Figure 8:
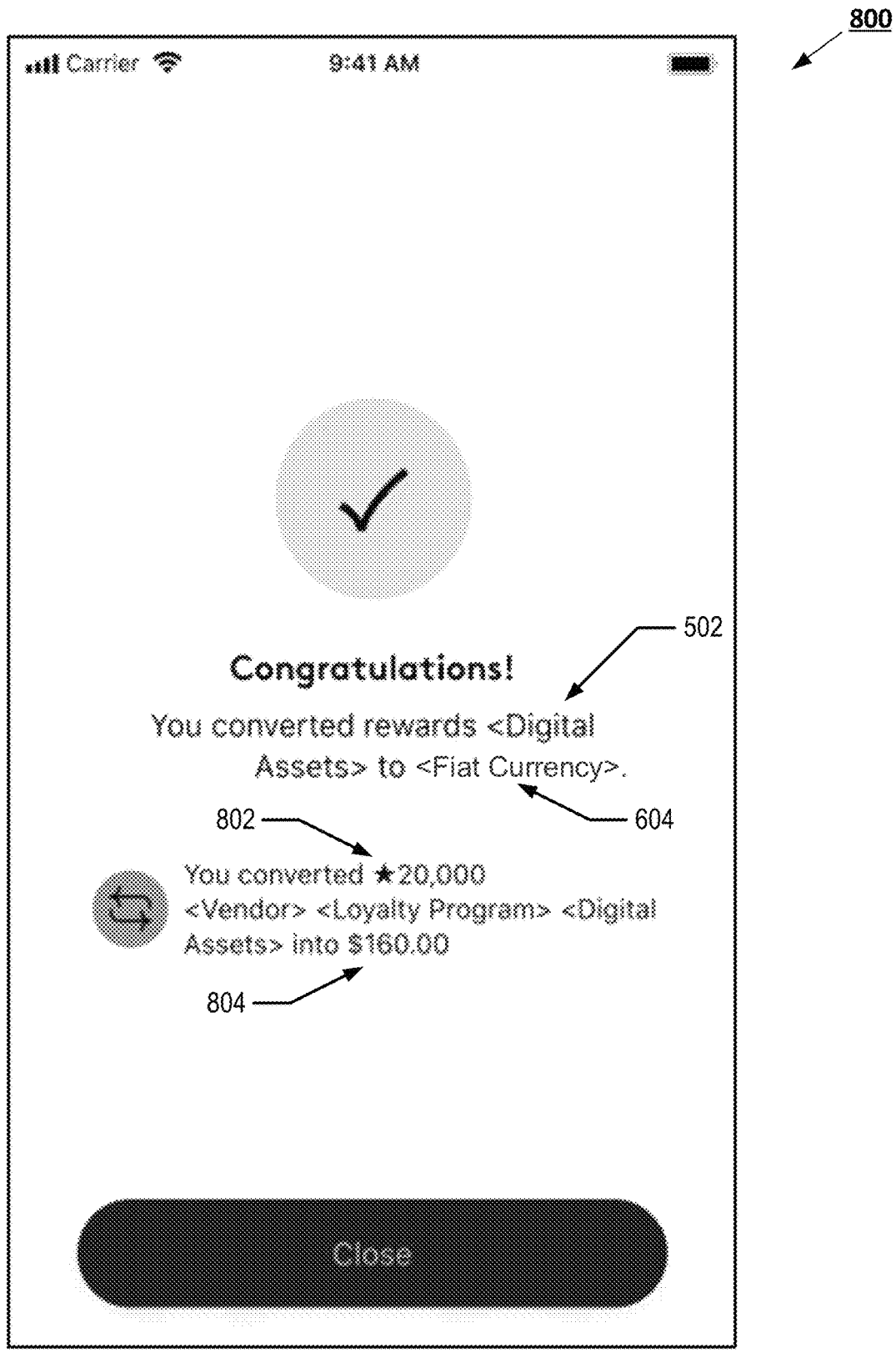

FIG. 8 provides a user interface 800 configured to notify the end user that the conversion of the digital asset 502 to the fiat currency 602 was executed and completed. User interface 800 may then be provided subsequent to user interaction with the conversion execution mechanism 706 in user interface 700. User interface 800 may be configured to indicate to the end user of the client device 104 that the conversion of the digital asset 502 to the fiat currency 602 was executed, which specifically comprises (i) the debiting of a number of digital assets units from the digital asset user account 506, and (ii) the crediting of a number of fiat currency units to a fiat currency user account. It may be appreciated that the debited number of digital asset units may or may not be the original number of digital asset units to debit 610 as specified by the end user and indicated in previous user interfaces (e.g., user interface 600, user interface 700) for various factors, such as the conversion thresholds and/or limits established by the digital asset exchange system 106 or various fees for executing the digital asset conversion. Likewise, the credited number of fiat currency units may or may not be the original number of fiat currency units to credit 608. Thus, in the exemplary illustrative scenario, the end user is informed via user interface 800 that the conversion has been executed, and that the end user has been credited with USD $160. Additionally, the end user is notified that the end user has twenty-thousand fewer reward points in the digital asset user account 506.

Subsequent to user interface 800, an updated user interface similar to user interface 500 may be provided via the client device 104. Various information within the updated user interface may reflect the executed and completed conversion. For example, in the illustrated embodiment, the digital asset unit balance 508 may indicate sixty-thousand units, due to the debiting of twenty-thousand digital asset units from the original balance of eighty-thousand units. In various embodiments, the executed and completed conversion may be indicated within the historical account activity 510 with a timestamp associated with the execution of the conversion. As mentioned, an account balance data object corresponding to the digital asset user account 506 may be updated subsequent or during the execution of the digital asset conversion. Accordingly, the client device 104 may generate and provide the updated user interface based at least in part on the updated account balance data object. Information for the fiat currency user account may additionally be provided to the end user via the updated user interface and/or another user interface. Specifically, an updated fiat currency unit balance 702 may be indicated to the end user. For example, in the illustrated embodiment, the updated fiat currency unit balance 702 may indicate USD $660 to reflect the crediting of USD $160 to the original balance of USD $500.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating and transmitting a first conversion rate application programming interface (API) request, wherein (i) the first conversion rate API request is associated with a first digital asset conversion request at a first timepoint and a digital asset user account identifiable by an identifier token associated with an end user, wherein the identifier token is a federated identifier token and configured to identify a plurality of digital asset user accounts associated with the end user and managed by one or more different digital asset exchange systems, (ii) the first conversion rate API request comprises a conversion behavior analytics data object, (iii) the first conversion rate API request indicates a digital asset associated with the first digital asset conversion request, and (iv) the first digital asset conversion request indicates a first number of digital asset units;
receiving a first conversion rate API response comprising a first conversion rate for the digital asset and a fiat currency, wherein the first conversion rate is determined based at least in part on a digital asset exchange system providing at least the conversion behavior analytics data object to a predictive model configured to determine a conversion rate with a significant likelihood of causing the end user to request execution of a digital asset conversion and the digital asset exchange system receiving a first determined conversion rate from the predictive model;
providing the first conversion rate for display via a client device;
responsive to determining that a first configurable time period has elapsed, wherein the first configurable time period is a conversion rate refresh period within which the first conversion rate is accurate for a value of the digital asset:
generating and transmitting a second conversion rate API request, wherein the second conversion rate API request indicates the digital asset,
receiving a second current pricing data API response comprising a second conversion rate for the digital asset and the fiat currency, wherein the second conversion rate is based at least in part on the digital asset exchange system providing at least the conversion behavior analytics data object to the predictive model configured to determine the conversion rate with the significant likelihood of causing the end user to request execution of the digital asset conversion and the digital asset exchange system receiving a second determined conversion rate from the predictive model, and
providing the second conversion rate for display via the client device;
receiving a second digital asset conversion request, wherein the second digital asset conversion request (i) is at a second timepoint, (ii) is associated with the digital asset user account identifiable by the identifier token associated with the end user, and (iii) indicates a second number of digital asset units;
executing the digital asset conversion request for the second digital asset conversion request within a second configurable time period, wherein the second configurable time period is a conversion rate execution time period within which the second conversion rate is valid for the execution of the digital asset conversion, and wherein executing the digital asset conversion comprises:
determining whether the second number of digital asset units and a second number of fiat currency units satisfy one or more configurable conversion thresholds, wherein at least one of the one or more configurable conversion thresholds is configured by the digital asset exchange system;
responsive to determining that the second number of digital asset units and the second number of fiat currency units do not satisfy the one or more configurable conversion thresholds, modifying at least the second number of digital asset units;
causing the second number of digital asset units to be debited from the digital asset user account; and
causing a transfer of the second number of fiat currency units to a fiat currency user account originating from a fiat currency central operating account;
dynamically providing a notification of execution of the digital asset conversion via the client device;
updating a first account balance data object associated with the digital asset user account, a second account balance data object associated with the fiat currency user account, and the conversion behavior analytics data object based at least in part on the digital asset conversion; and
subsequent to executing the digital asset conversion, executing a fiat currency transaction with the digital asset exchange system, wherein the fiat currency transaction with the digital asset exchange system is a fiat currency settlement for at least the transfer of the second number of fiat currency units to the fiat currency user account originating from the fiat currency central operating account, wherein executing the fiat currency transaction is responsive to generating and transmitting a settlement request such that the digital asset exchange system receives the settlement request, wherein the settlement request indicates a third number of fiat currency units, and wherein the settlement request is transmitted based at least in part on a third configurable time period, and
wherein the conversion behavior analytics data object comprises (i) a first number of digital asset conversion requests received originating from the end user within a fourth configurable time period, (ii) a second number of digital asset conversion requests received originating from a conversion behavior cohort of the end user within the fourth configurable time period, (iii) one or more conversion rates at which one or more digital asset conversions were previously executed for the end user within the fourth configurable time period, and (iv) at least one conversion rate at which one or more digital asset conversions were previously executed for the conversion behavior cohort of the end user within the fourth configurable time period.

2. The computer-implemented method of claim 1, wherein the digital asset user account is managed by the digital asset exchange system, and causing the second number of digital asset units to be debited from the digital asset user account comprises:
generating and transmitting a conversion execution API request such that the digital asset exchange system receives the conversion execution API request, wherein (i) the conversion execution API request indicates the second number of digital asset units, (ii) the conversion execution API request comprises the identifier token associated with the end user, and (iii) the conversion execution API request is configured to cause the digital asset exchange system to debit the second number of digital asset units from the digital asset user account identifiable by the identifier token, and receiving a conversion execution API response indicating that the debiting of the second number of digital asset units from the digital asset user account was completed.

3. The computer-implemented method of claim 1, wherein the fiat currency transaction with the digital asset exchange system is a fiat currency settlement for a plurality of transfers of fiat currency units to a plurality of fiat currency user accounts originating from the fiat currency central operating account executed within the third configurable time period.

4. The computer-implemented method of claim 1, wherein providing the first conversion rate for display via the client device comprises dynamically determining a first number of fiat currency units based at least in part on the first conversion rate and the first number of digital asset units, and displaying the first number of fiat currency units via the client device.

5. The computer-implemented method of claim 1, wherein the digital asset is one of (i) a liability digital asset, (ii) a cryptocurrency digital asset, or (iii) a single-unit digital asset.

6. A system comprising one or more memory storage areas and one or more processors, the system configured for:

generating and transmitting a first conversion rate application programming interface (API) request, wherein (i) the first conversion rate API request is associated with a first digital asset conversion request at a first timepoint and a digital asset user account identifiable by an identifier token associated with an end user, wherein the identifier token is a federated identifier token and configured to identify a plurality of digital asset user accounts associated with the end user and managed by one or more different digital asset exchange systems, (ii) the first conversion rate API request comprises a conversion behavior analytics data object, (iii) the first conversion rate API request indicates a digital asset associated with the first digital asset conversion request, and (iv) the first digital asset conversion request indicates a first number of digital asset units;

receiving a first conversion rate API response comprising a first conversion rate for the digital asset and a fiat currency, wherein the first conversion rate is determined based at least in part on a digital asset exchange system providing at least the conversion behavior analytics data object to a predictive model configured to determine the conversion rate with the significant likelihood of causing the end user to request execution of a digital asset conversion and the digital asset exchange system receiving a first determined conversion rate from the predictive model;

providing the first conversion rate for display via a client device;

responsive to determining that a first configurable time period has elapsed, wherein the first configurable time period is a conversion rate refresh period within which the first conversion rate is accurate for a value of the digital asset:

generating and transmitting a second conversion rate API request, wherein the second conversion rate API request indicates the digital asset, receiving a second current pricing data API response comprising a second conversion rate for the digital asset and the fiat currency, wherein the second conversion rate is based at least in part on the digital asset exchange system providing at least the conversion behavior analytics data object to the predictive model configured to determine the conversion rate with the significant likelihood of causing the end user to request execution of the digital asset conversion and the digital asset exchange system receiving a second determined conversion rate from the predictive model, and providing the second conversion rate for display via the client device;

receiving a second digital asset conversion request, wherein the second digital asset conversion request (i) is at a second timepoint, (ii) is associated with the digital asset user account identifiable by the identifier token associated with the end user, and (iii) indicates a second number of digital asset units;

executing the digital asset conversion for the second digital asset conversion request within a second configurable time period, wherein the second configurable time period is a conversion rate execution time period within which the second conversion rate is valid for the execution of the digital asset conversion, and wherein executing the digital asset conversion comprises:

determining whether the second number of digital asset units and a second number of fiat currency units satisfy one or more configurable conversion thresholds, wherein at least one of the one or more configurable conversion thresholds is configured by the digital asset exchange system;

responsive to determining that the second number of digital asset units and the second number of fiat currency units do not satisfy the one or more configurable conversion thresholds, modifying at least the second number of digital asset units;

causing the second number of digital asset units to be debited from the digital asset user account; and causing a transfer of the second number of fiat currency units to a fiat currency user account originating from a fiat currency central operating account;

dynamically providing a notification of execution of the digital asset conversion via the client device;

updating a first account balance data object associated with the digital asset user account, a second account balance data object associated with the fiat currency user account, and the conversion behavior analytics data object based at least in part on the digital asset conversion; and subsequent to executing the digital asset conversion, executing a fiat currency transaction with the digital asset exchange system, wherein the fiat currency transaction with the digital asset exchange system is a fiat currency settlement for at least the transfer of the second number of fiat currency units to the fiat currency user account originating from the fiat currency central operating account, wherein executing the fiat currency transaction is responsive to generating and transmitting a settlement request such that the digital asset exchange system receives the settlement request, wherein the settlement request indicates a third number of fiat currency units, and wherein the settlement request is transmitted based at least in part on a third configurable time period, and wherein the conversion behavior analytics data object comprises (i) a first number of digital asset conversion requests received originating from the end user within a fourth configurable time period, (ii) a second number of digital asset conversion requests received originating from a conversion behavior cohort of the end user within the fourth configurable time period, (iii) one or more conversion rates at which one or more digital asset conversions were previously executed for the end user within the fourth configurable time period, and (iv) at least one conversion rate at which one or more digital asset conversions were previously executed for the conversion behavior cohort of the end user within the fourth configurable time period.

7. The system of claim 6, wherein the digital asset user account is managed by the digital asset exchange system, and causing the second number of digital asset units to be debited from the digital asset user account comprises:
 generating and transmitting a conversion execution API request such that the digital asset exchange system receives the conversion execution API request, wherein (i) the conversion execution API request indicates the second number of digital asset units, (ii) the conversion execution API request comprises the identifier token associated with the end user, and (iii) the conversion execution API request is configured to cause the digital asset exchange system to debit the second number of digital asset units from the digital asset user account identifiable by the identifier token, and
 receiving a conversion execution API response indicating that the debiting of the second number of digital asset units from the digital asset user account was completed.

8. The system of claim 6, wherein providing the first conversion rate for display via the client device comprises dynamically determining a first number of fiat currency units based at least in part on the first conversion rate and the first number of digital asset units, and displaying the first number of fiat currency units via the client device.

9. A computer program product comprising at least one non-transitory computer-readable storage medium having computer-readable program code portions stored therein, the computer-readable program code portions comprising executable portions configured for:
 generating and transmitting a first conversion rate application programming interface (API) request, wherein (i) the first conversion rate API request is associated with a first digital asset conversion request at a first timepoint and a digital asset user account identifiable by an identifier token associated with an end user, wherein the identifier token is a federated identifier token and configured to identify a plurality of digital asset user accounts associated with the end user and managed by one or more different digital asset exchange systems, (ii) the first conversion rate API request comprises a conversion behavior analytics data object, (iii) the first conversion rate API request indicates a digital asset associated with the first digital asset conversion request, and (iv) the first digital asset conversion request indicates a first number of digital asset units;
 receiving a first conversion rate API response comprising a first conversion rate for the digital asset and a fiat currency, wherein the first conversion rate is determined based at least in part on a digital asset exchange system providing at least the conversion behavior analytics data object to a predictive model configured to determine a conversion rate with a significant likelihood of causing the end user to request execution of a digital asset conversion and the digital asset exchange system receiving a first determined conversion rate from the predictive model;
 providing the first conversion rate for display via a client device;
 responsive to determining that a first configurable time period has elapsed, wherein the first configurable time period is a conversion rate refresh period within which the first conversion rate is accurate for a value of the digital asset:
generating and transmitting a second conversion rate API request, wherein the second conversion rate API request indicates the digital asset,
 receiving a second current pricing data API response comprising a second conversion rate for the digital asset and the fiat currency, wherein the second conversion rate is based at least in part on the digital asset exchange system providing at least the conversion behavior analytics data object to the predictive model configured to determine the conversion rate with the significant likelihood of causing the end user to request execution of the digital asset conversion and the digital asset exchange system receiving a second determined conversion rate from the predictive model, and providing the second conversion rate for display via the client device;
 receiving a second digital asset conversion request, wherein the second digital asset conversion request (i) is at a second timepoint, (ii) is associated with the digital asset user account identifiable by the identifier token associated with the end user, and (iii) indicates a second number of digital asset units;
 executing the digital asset conversion for the second digital asset conversion request within a second configurable time period, wherein the second configurable time period is a conversion rate execution time period within which the second conversion rate is valid for the execution of the digital asset conversion, and wherein executing the digital asset conversion comprises:
 determining whether the second number of digital asset units and a second number of fiat currency units satisfy one or more configurable conversion thresholds, wherein at least one of the one or more configurable conversion thresholds is configured by the digital asset exchange system;
 responsive to determining that the second number of digital asset units and the second number of fiat currency units do not satisfy the one or more configurable conversion thresholds, modifying at least the second number of digital asset units;
causing the second number of digital asset units to be debited from the digital asset user account; and
 causing a transfer of the second number of fiat currency units to a fiat currency user account originating from a fiat currency central operating account; dynamically providing a notification of execution of the digital asset conversion via the client device;
 updating a first account balance data object associated with the digital asset user account, a second account balance data object associated with the fiat currency user account, and the conversion behavior analytics data object based at least in part on the digital asset conversion; and
 subsequent to executing the digital asset conversion, executing a fiat currency transaction with the digital asset exchange system, wherein the fiat currency transaction with the digital asset exchange system is a fiat currency settlement for at least the transfer of the second number of fiat currency units to the fiat currency user account originating from the fiat currency central operating account, wherein executing the fiat currency transaction is responsive to generating and transmitting a settlement request such that the digital asset exchange system receives the settlement request, wherein the settlement request indicates a third number of fiat currency units, and wherein the settlement request is transmitted based at least in part on a third configurable time period, and wherein the conversion behavior analytics data object comprises (i) a first number of digital asset conversion requests received originating from the end user within a fourth configurable time period, (ii) a second number of digital asset conversion requests received originating from a conversion behavior cohort of the end user within the fourth configurable time period, (iii) one or more conversion rates at which one or more digital asset conversions were previously executed for the end user within the fourth configurable time period, and (iv) at least one conversion rate at which one or more digital asset conversions were previously executed for the conversion behavior cohort of the end user within the fourth configurable time period.

\* \* \* \* \*

UNITED STATES PATENT AND TRADEMARK OFFICE
CERTIFICATE OF CORRECTION

| | | |
|---|---|---|
| PATENT NO. | : 11,880,826 B2 | Page 1 of 1 |
| APPLICATION NO. | : 17/378250 | |
| DATED | : January 23, 2024 | |
| INVENTOR(S) | : Christopher Michael Petersen et al. | |

It is certified that error appears in the above-identified patent and that said Letters Patent is hereby corrected as shown below:

In the Claims

In Column 41, Line 51, Claim 6, delete "determine the" and insert -- determine a --, therefor.

In Column 41, Line 51, Claim 6, delete "with the" and insert -- with a --, therefor.

Signed and Sealed this
Sixteenth Day of July, 2024

Katherine Kelly Vidal
*Director of the United States Patent and Trademark Office*